UNITED STATES PATENT OFFICE.

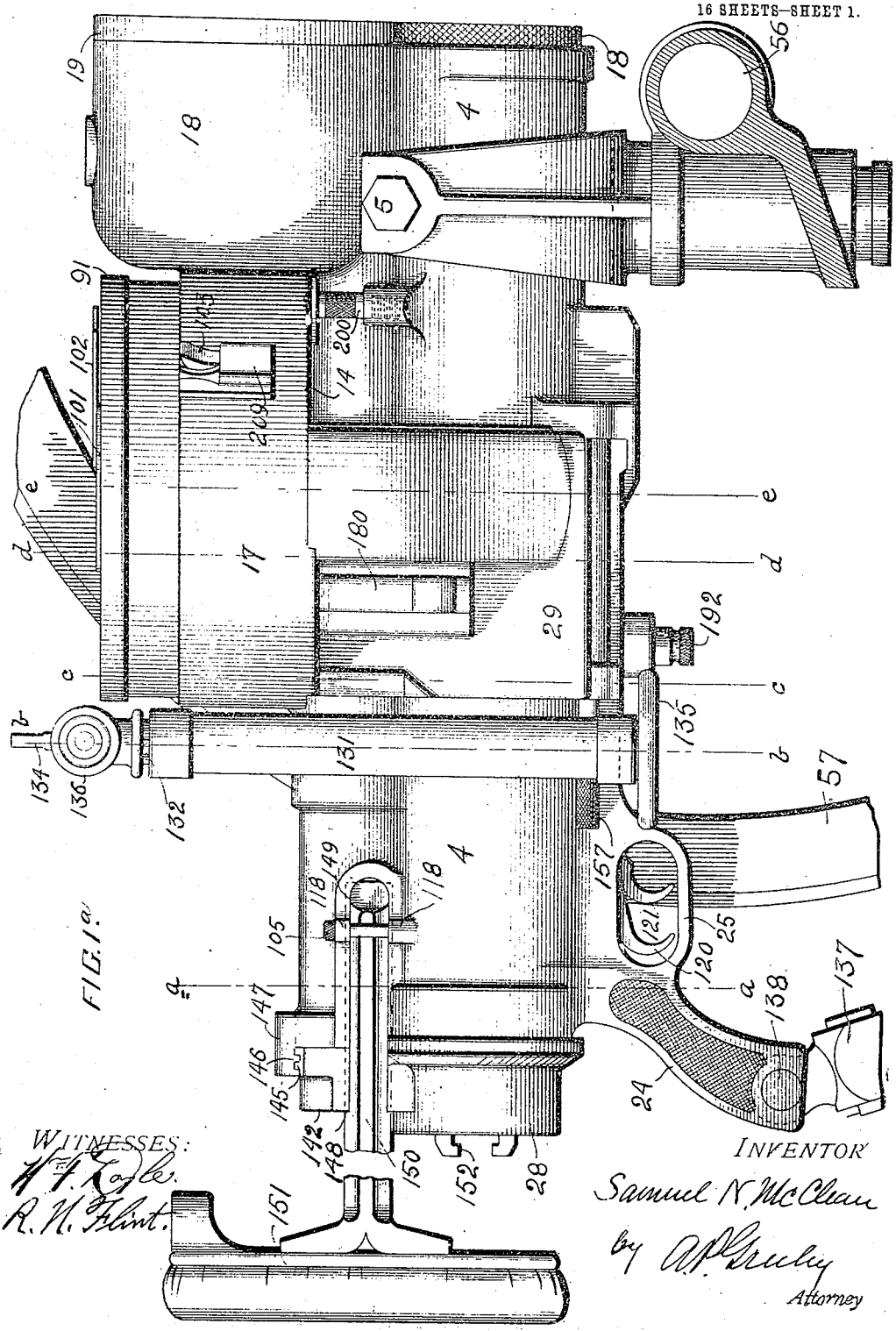

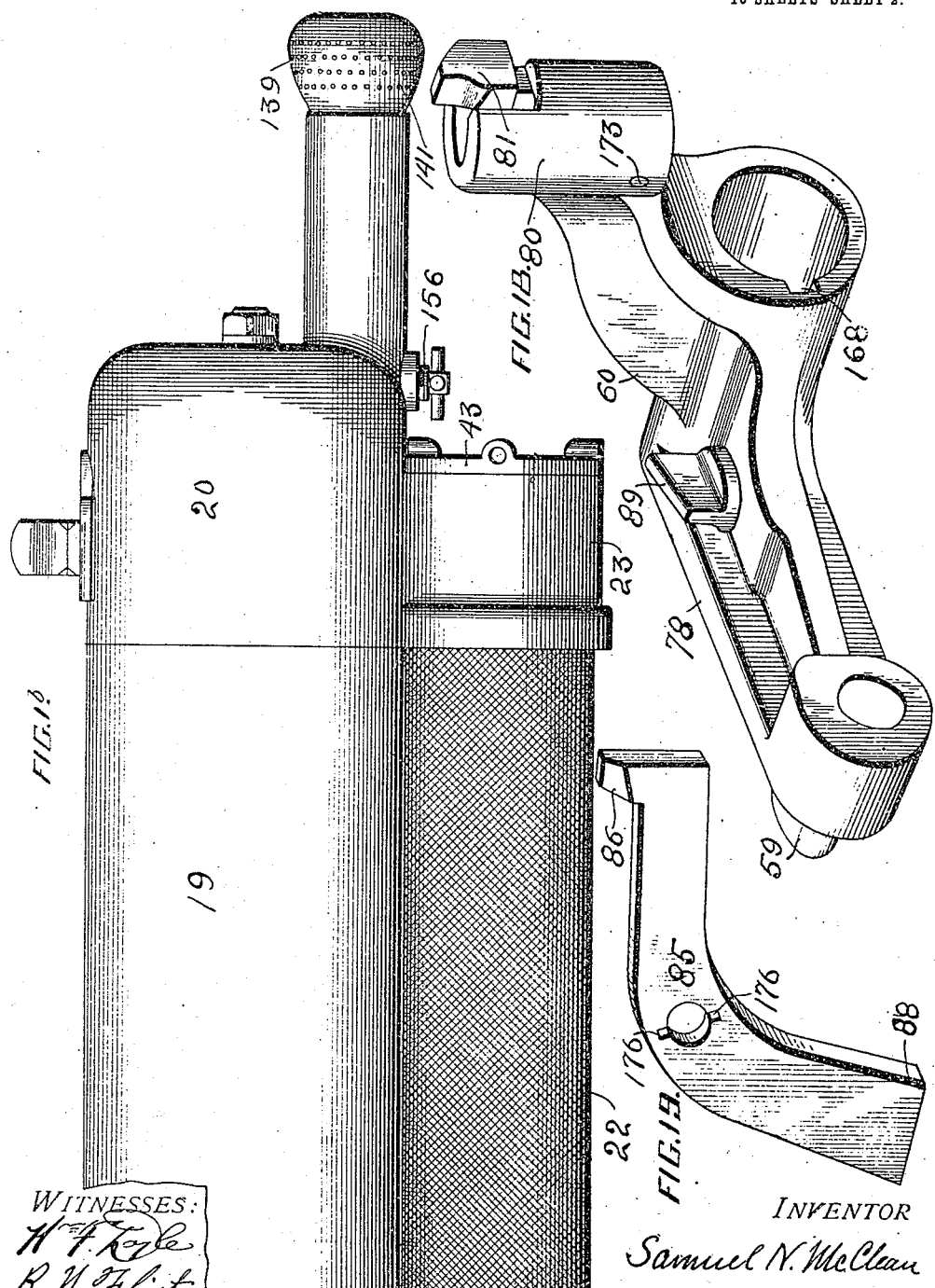

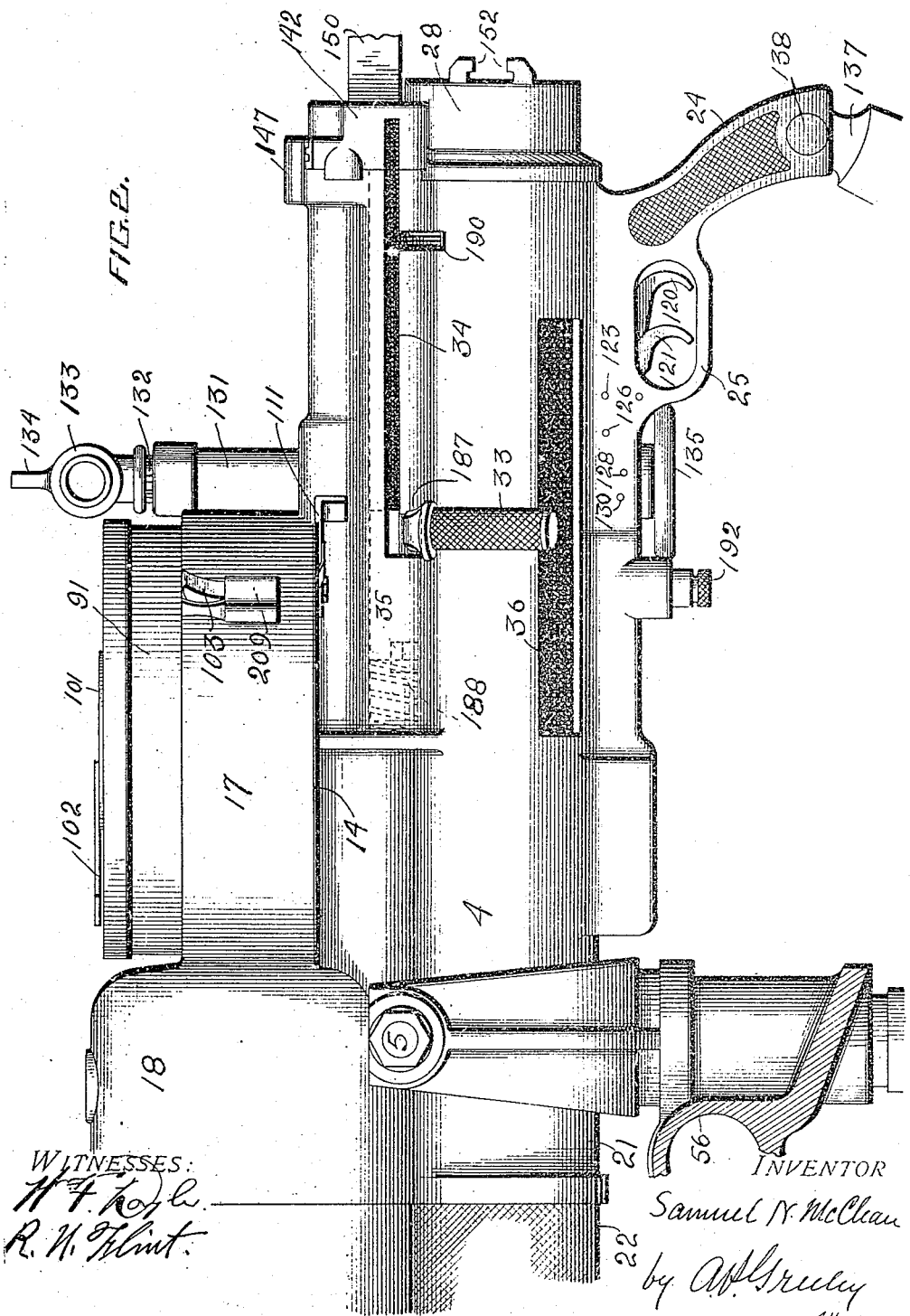

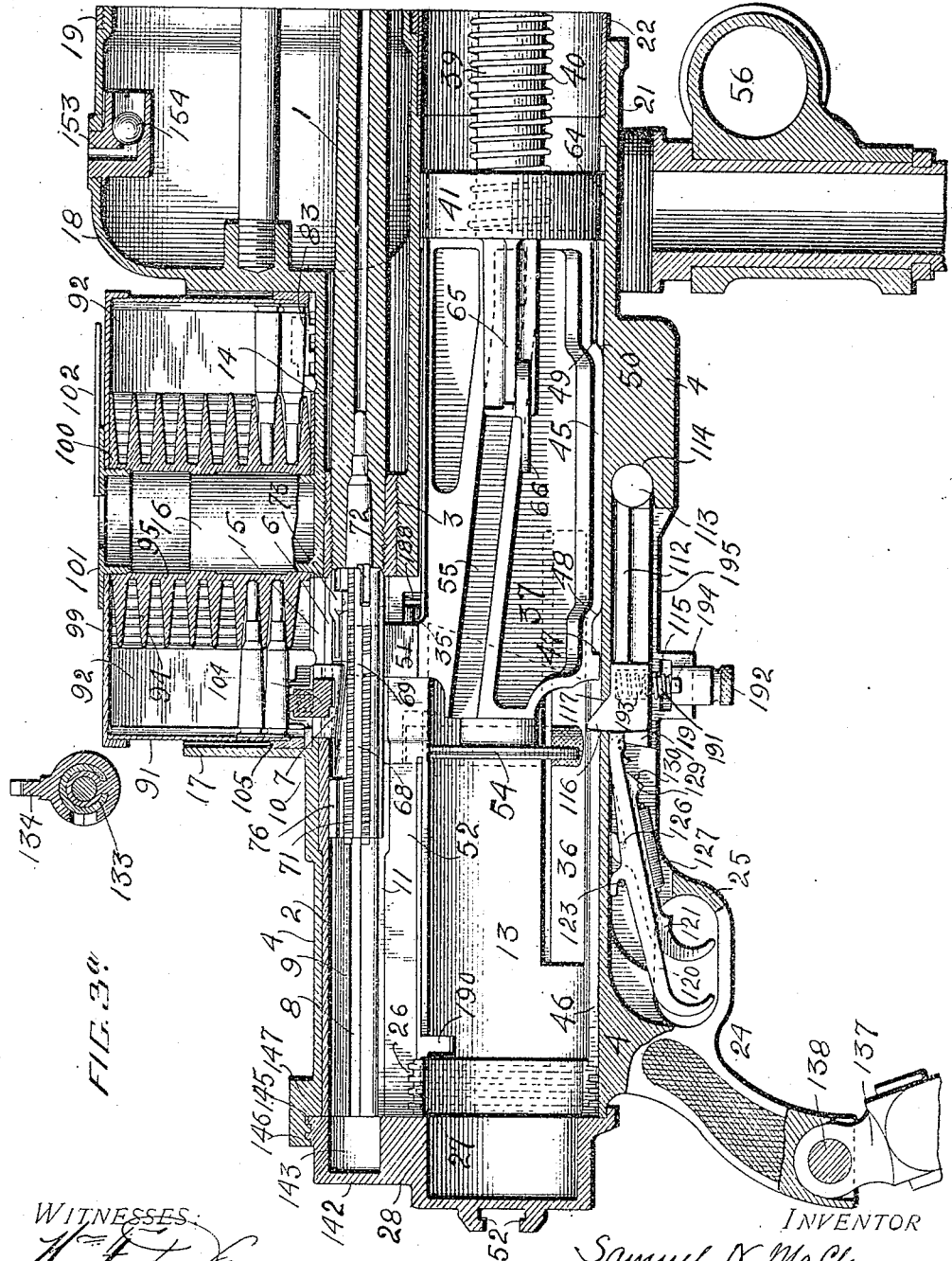

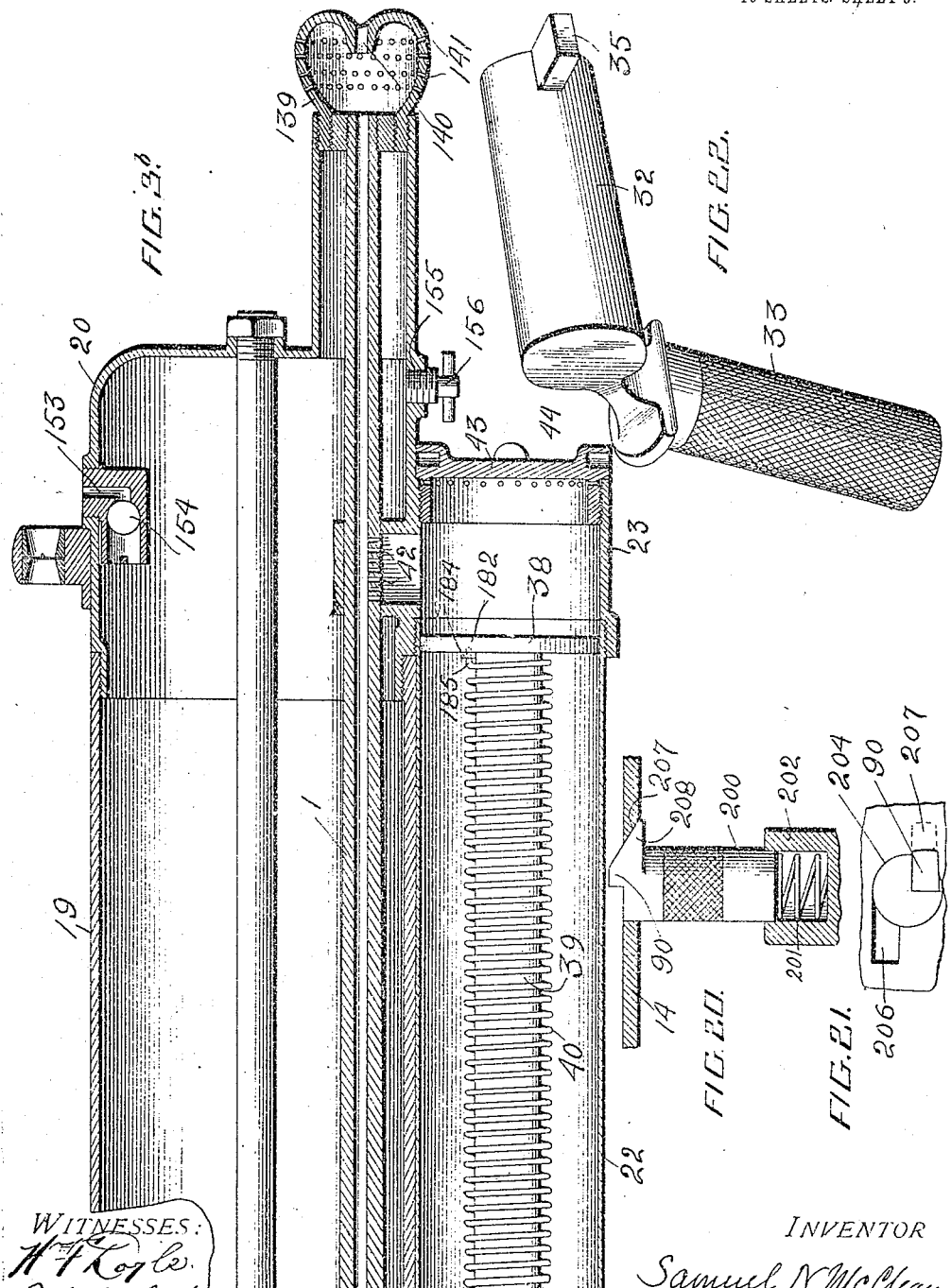

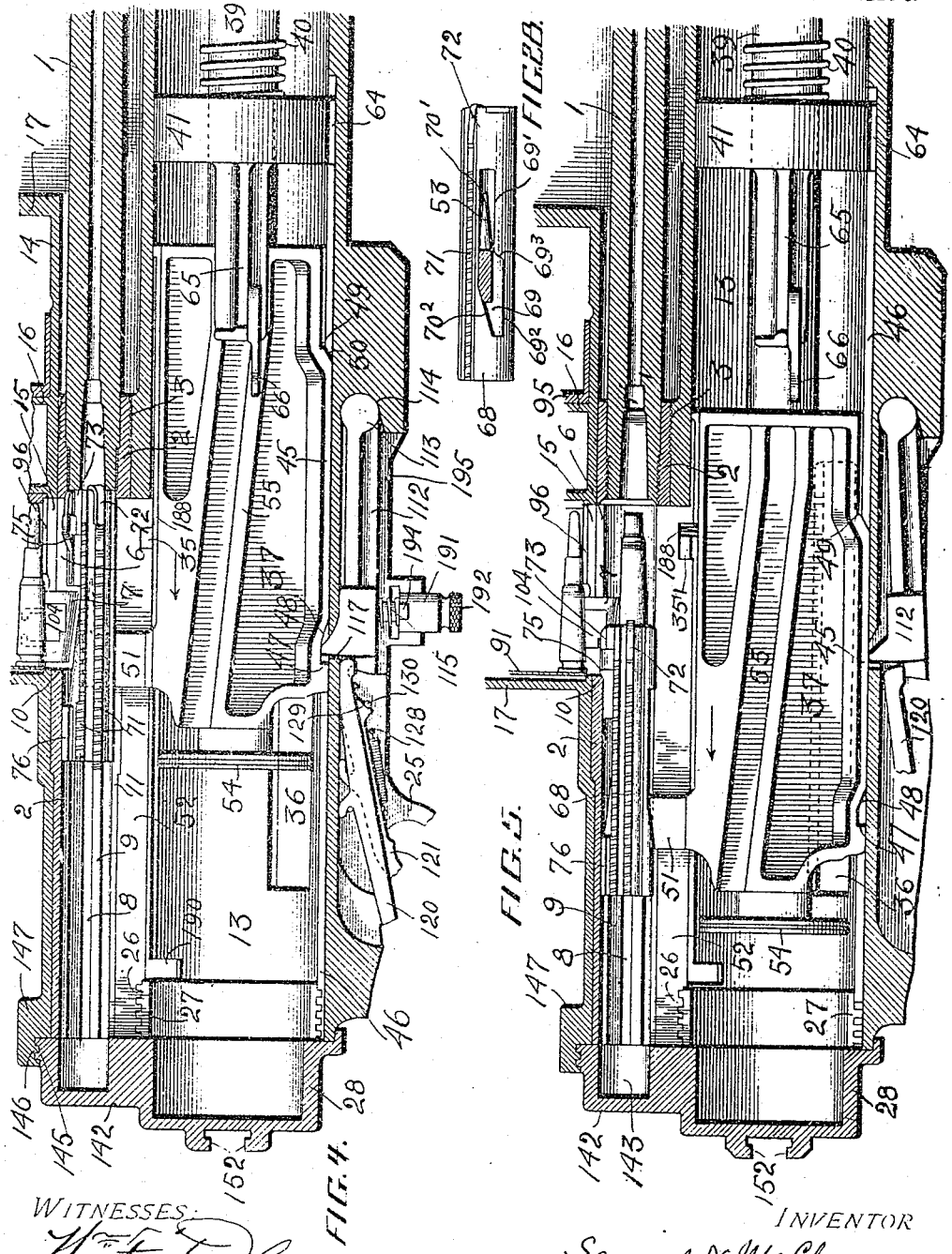

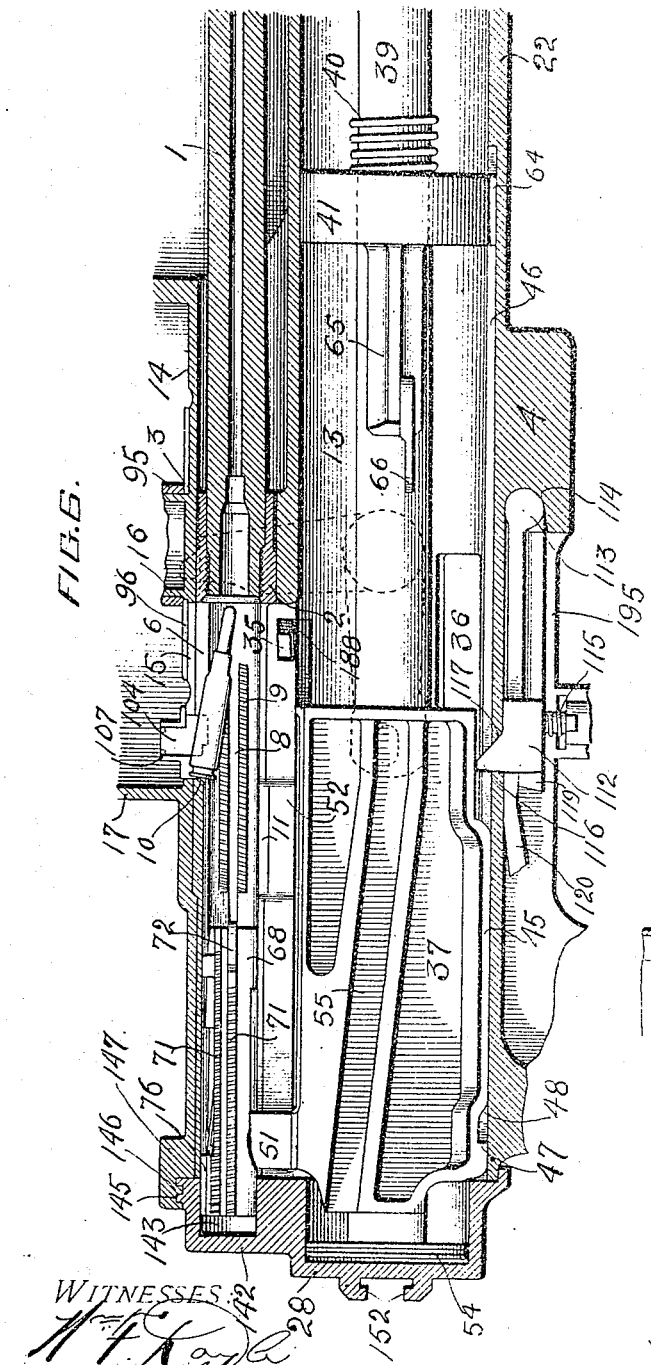

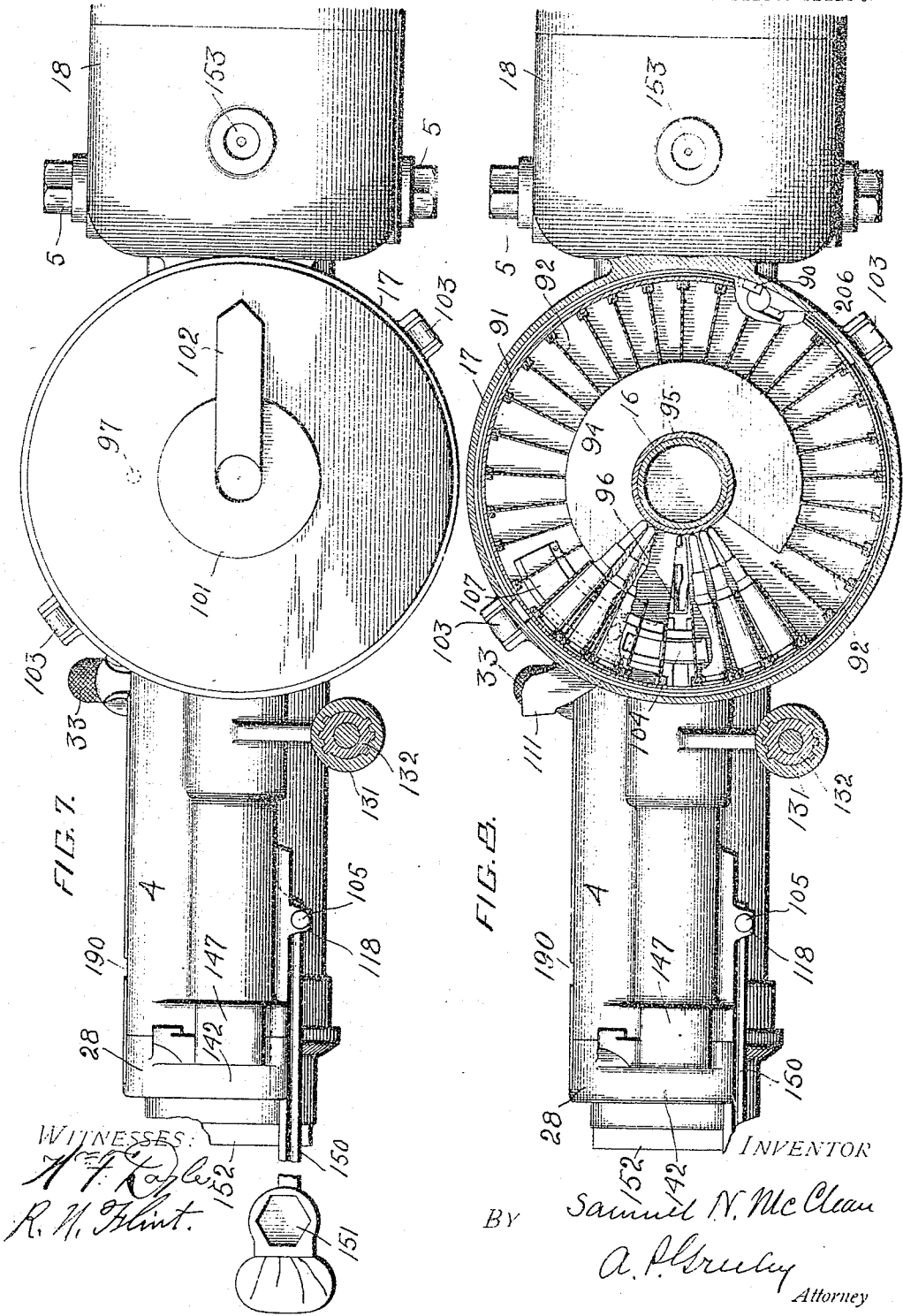

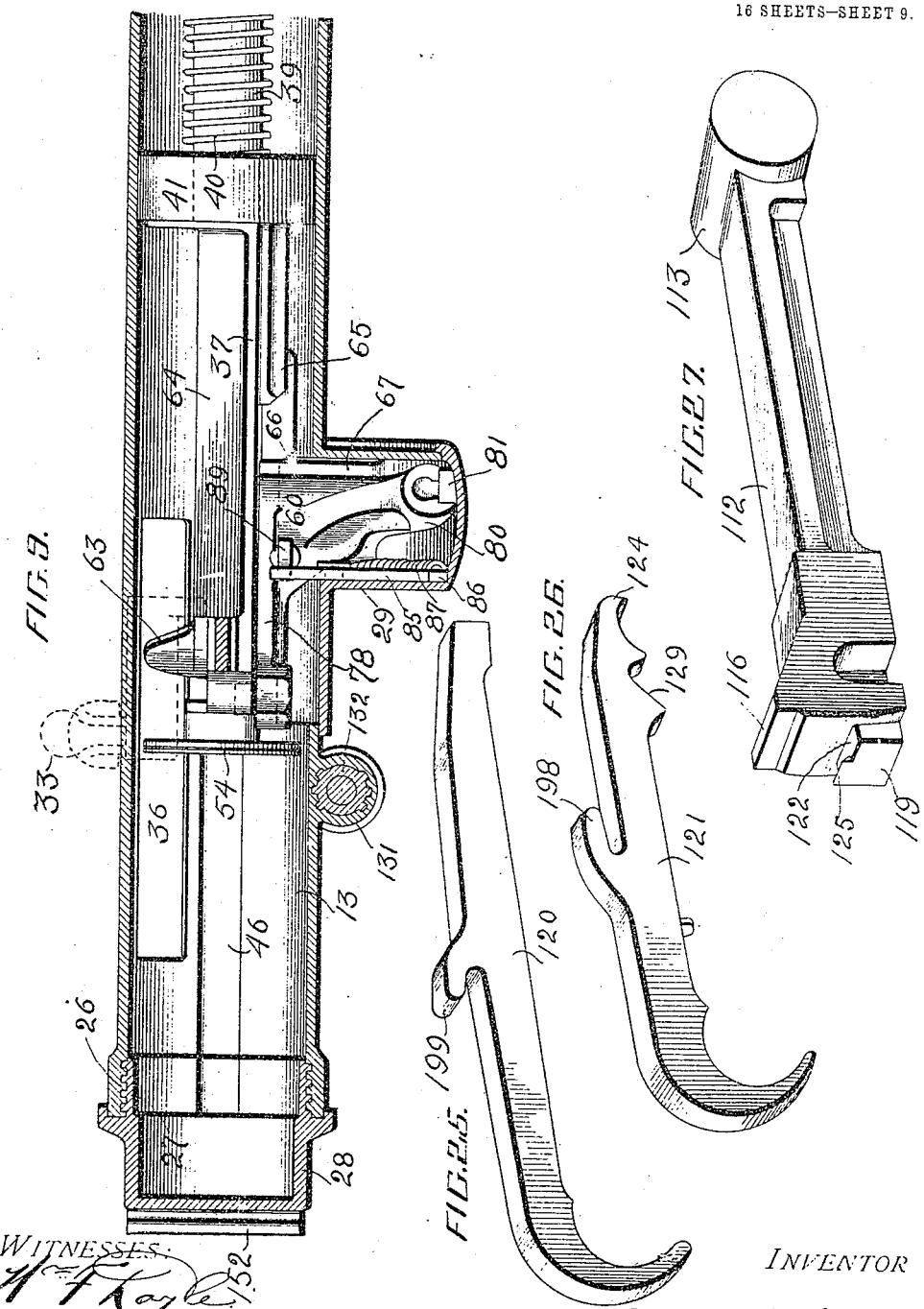
S. N. McCLEAN.
AUTOMATIC MACHINE GUN.
APPLICATION FILED JUNE 2, 1908.
1,042,135.
Patented Oct. 22, 1912.
16 SHEETS—SHEET 9.
INVENTOR
Samuel N. McClean

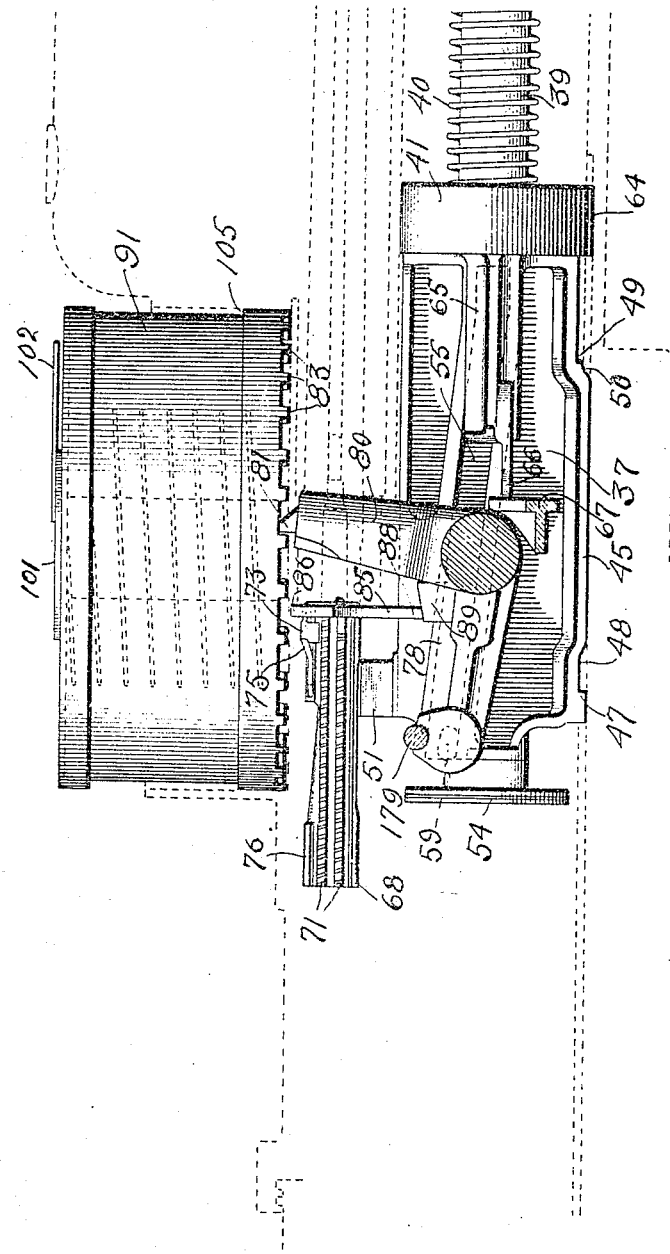

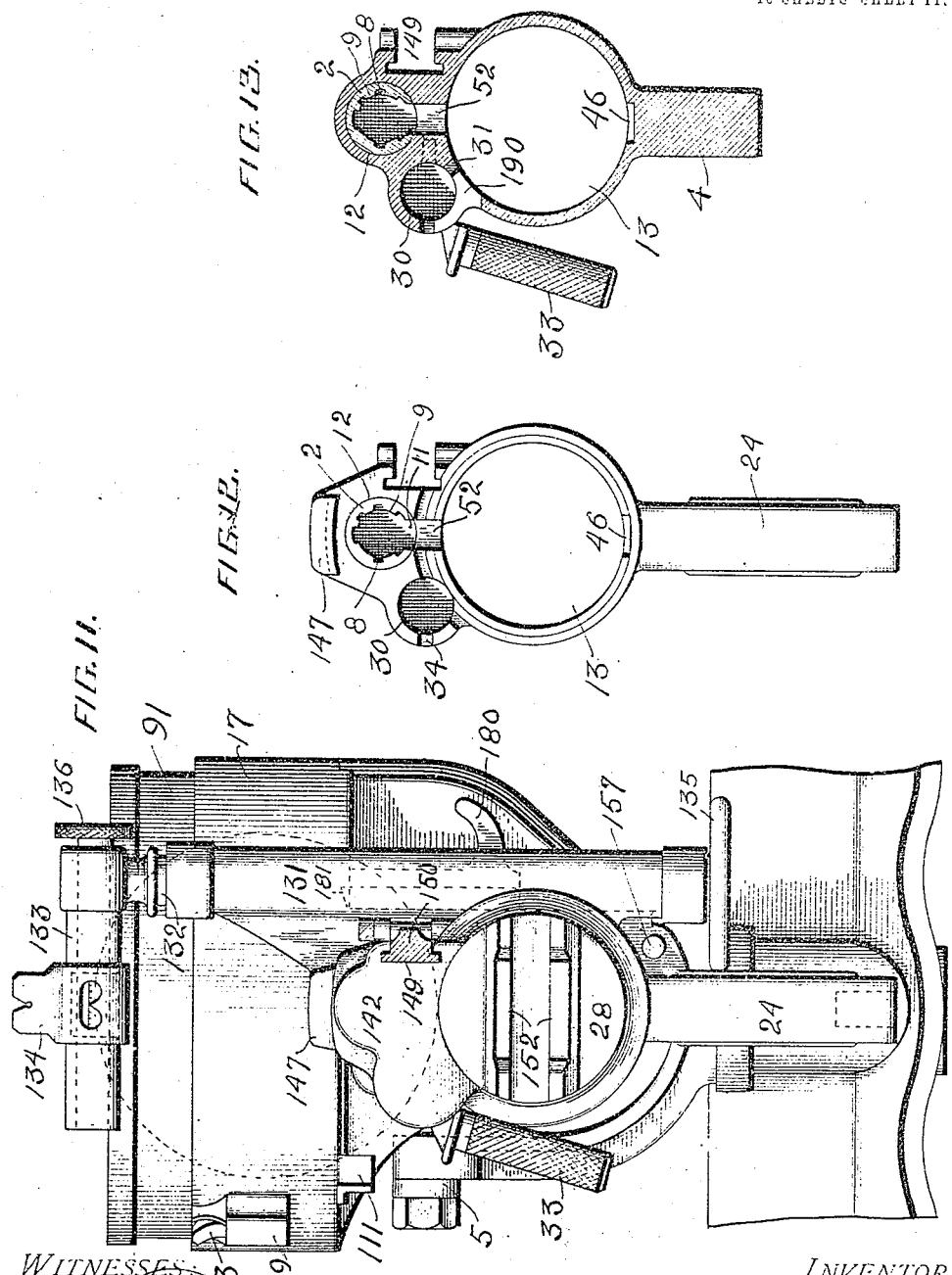

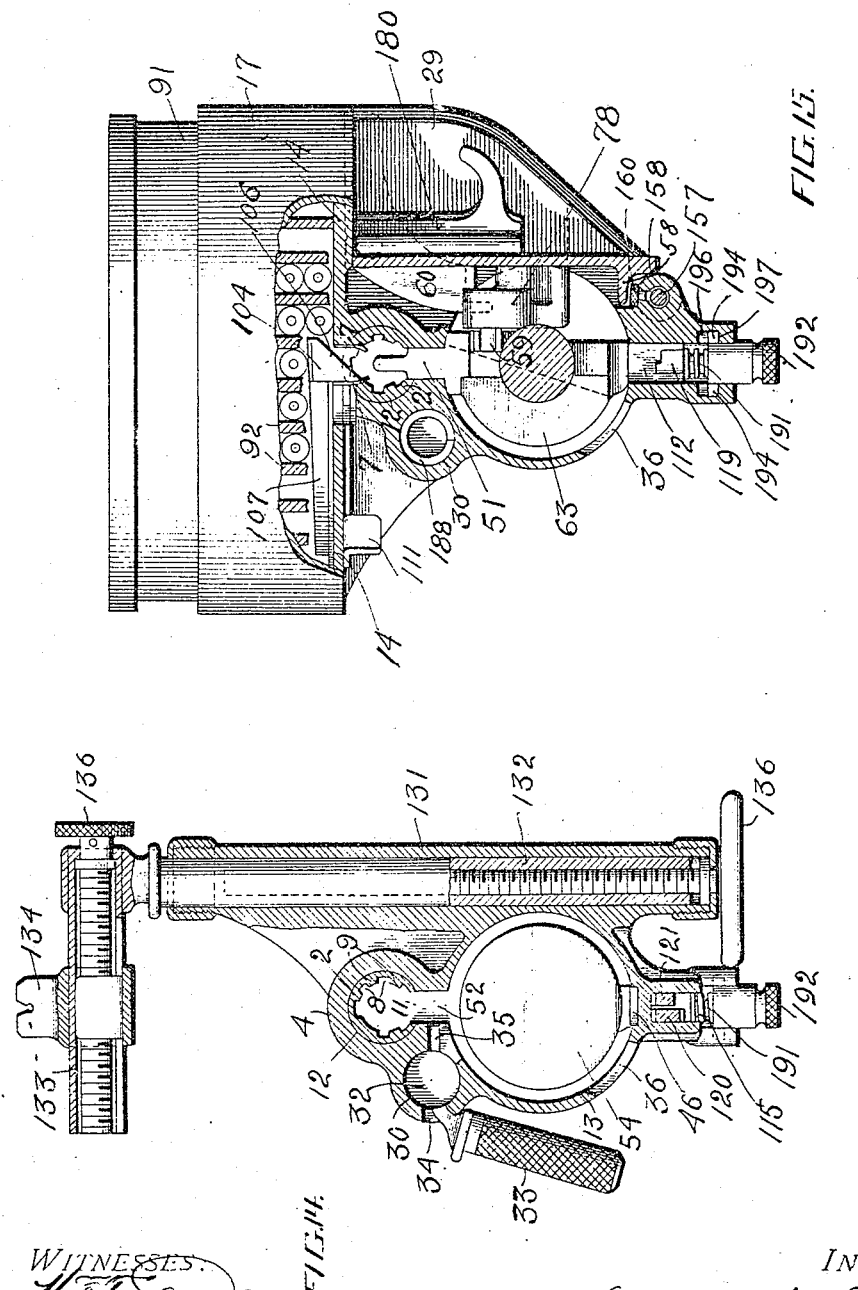

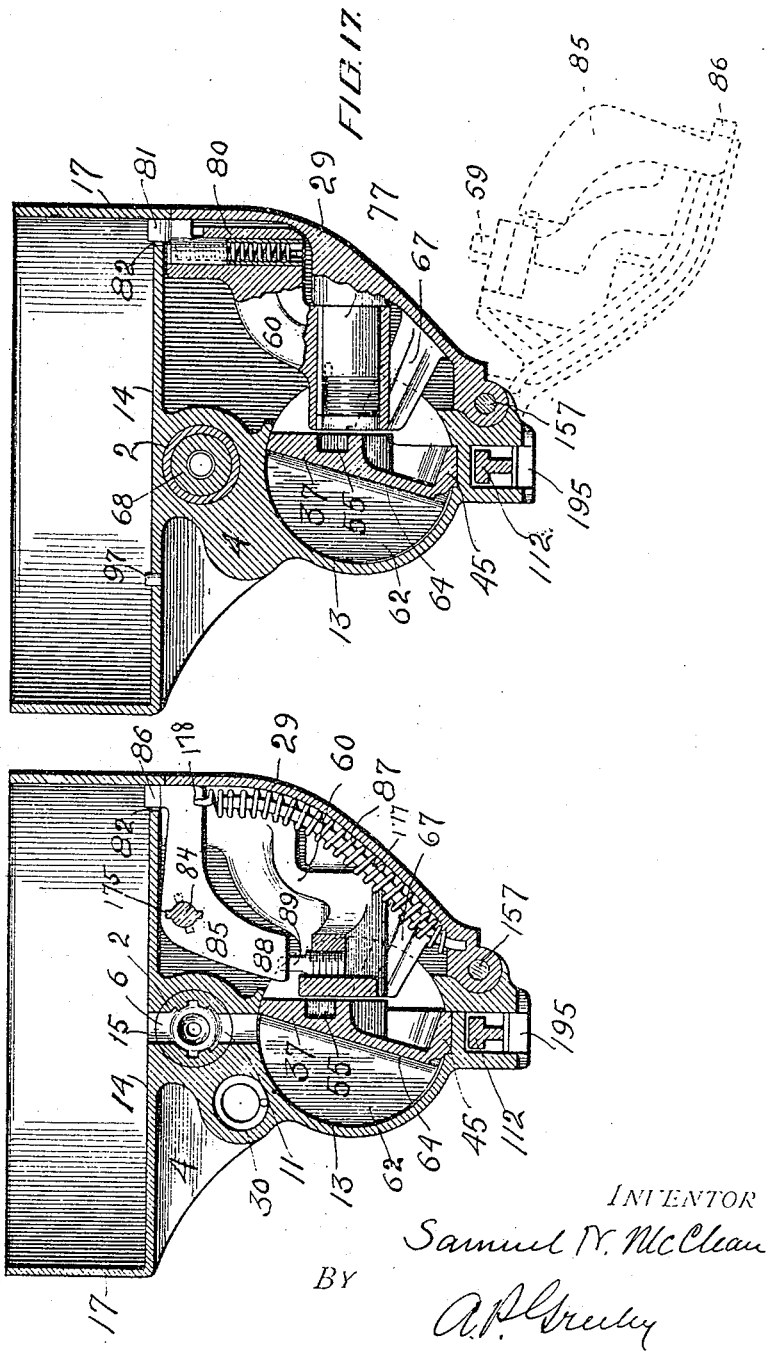

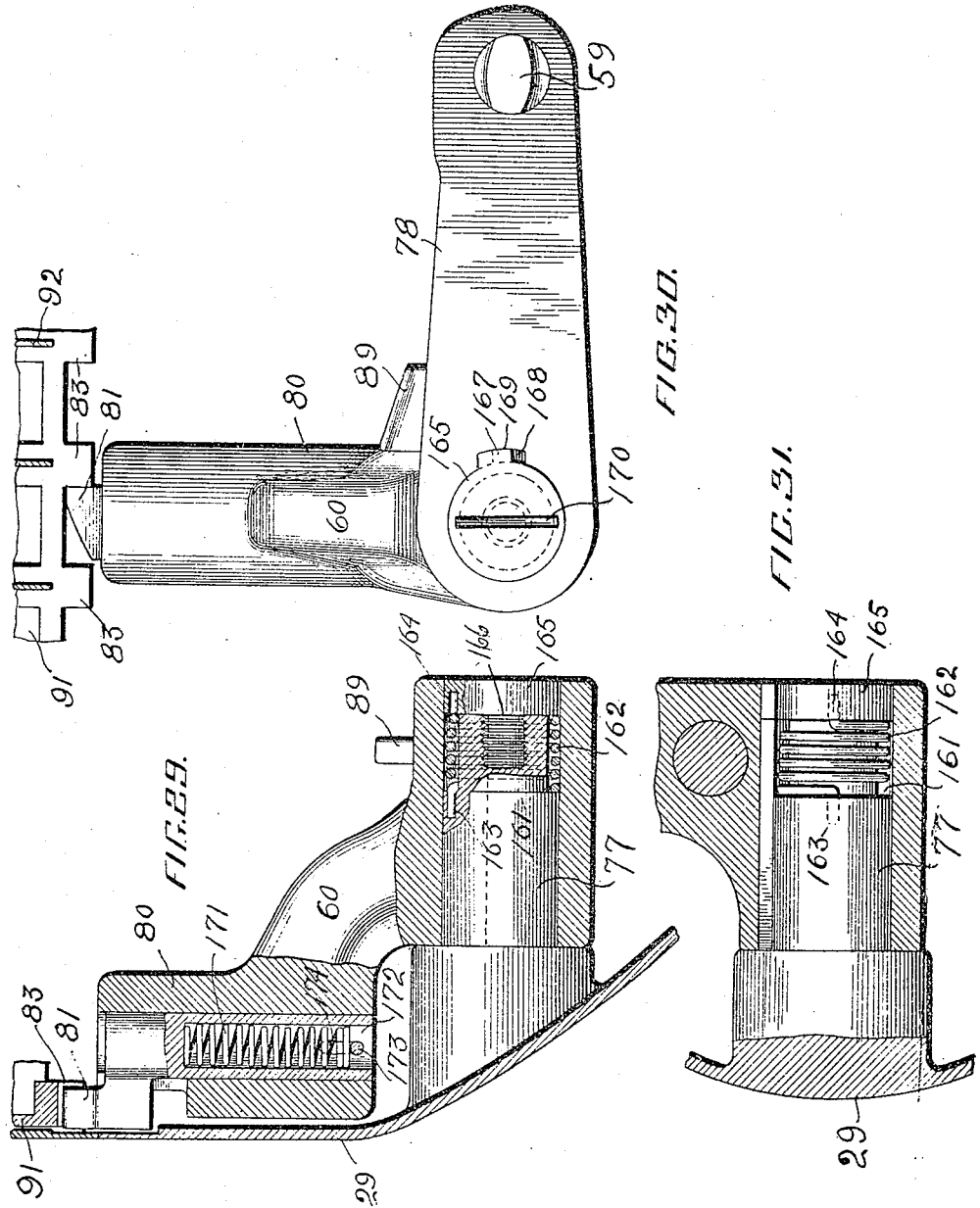

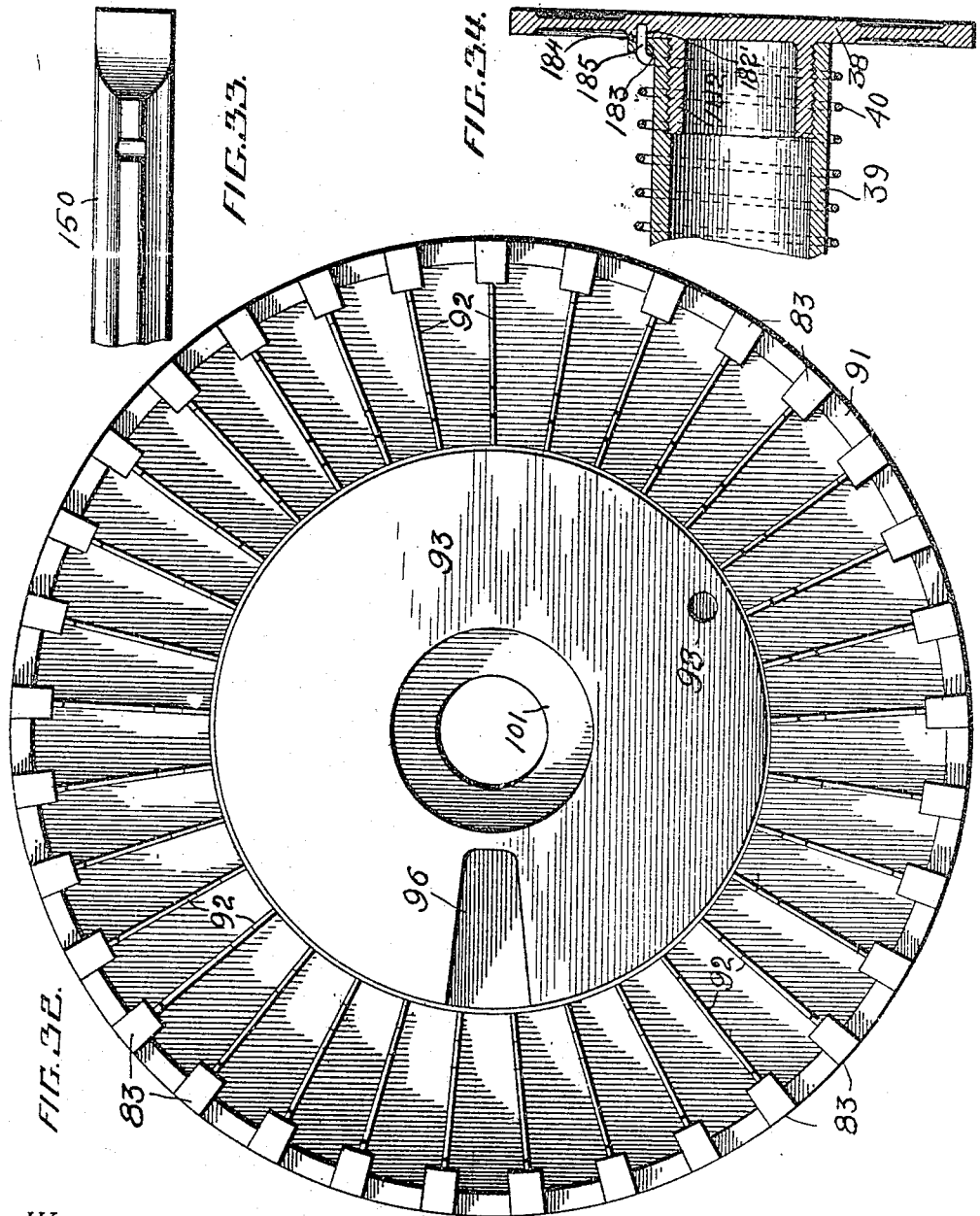

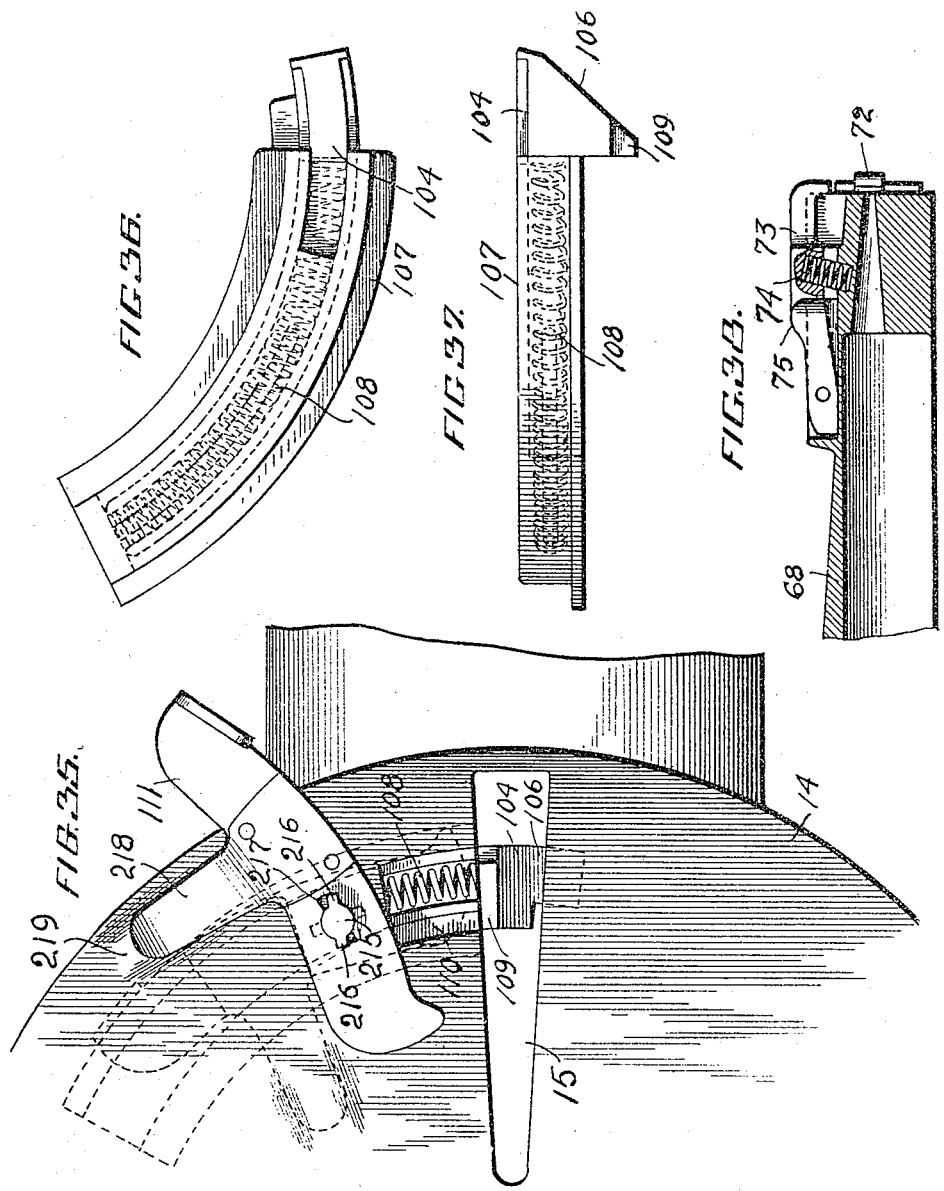

SAMUEL N. McCLEAN, OF CLEVELAND, OHIO, ASSIGNOR, BY MESNE ASSIGNMENTS, TO THE AUTOMATIC ARMS COMPANY.

AUTOMATIC MACHINE-GUN.

1,042,135.   Specification of Letters Patent.   Patented Oct. 22, 1912.

Application filed June 2, 1908. Serial No. 436,249.

*To all whom it may concern:*

Be it known that I, SAMUEL N. McCLEAN, a citizen of the United States, residing at Cleveland, in the county of Cuyahoga, State of Ohio, have invented certain new and useful Improvements in Automatic Machine-Guns, of which the following is a description, reference being had to the accompanying drawings, forming a part hereof.

The invention relates to machine guns and has for its object to provide a machine gun which shall be operated by the gases of discharge to automatically eject an empty shell, feed a fresh cartridge to position, insert it in the breech of the gun barrel and fire it and shall be simple in construction, not easily gotten out of order and readily taken down and assembled without the use of tools.

A further object of the invention is to provide in combination with a discharge actuated machine gun, a cartridge magazine and feed which will be simple in construction, certain and effective in operation and capable of feeding cartridges with positive regularity whatever the angle to which the gun may be elevated or depressed.

With these general objects in view together with the other objects hereinafter described, my invention consists in the discharge operated machine gun hereinafter described and the features of construction and combination of elements of such a gun as hereinafter particularly pointed out.

Referring to the drawings:—Figures 1ª and 1ᵇ are side elevations respectively of the rear portion and forward portion of the gun. Fig. 2 is a side elevation of the rear portion of the gun taken from the side opposite to that shown in Fig. 1ª. Figs. 3ª and 3ᵇ are vertical longitudinal sectional views showing respectively the rear portion and forward portion of the gun, the operating slide being shown in its forward position. Figs. 4, 5 and 6 are views similar to Fig. 3ª but showing the operating slide in different positions, Fig. 4 showing the slide as it begins to move rearward after firing, Fig. 5 showing the operating slide at the point at which the shell has been extracted and is about to be ejected, and Fig. 6 showing the operating slide in its extreme rearward position ready to move forward to push a fresh cartridge into the breech. Fig. 7 is a top plan view of the rear portion of the gun. Fig. 8 is a similar view with the cartridge magazine shown in section. Fig. 9 is a horizontal sectional view of the rear portion of the gun. Fig. 10 is a side elevation partly in section showing the operating slide and the parts operated by it. Fig. 11 is a rear elevation of the gun with the shoulder bar broken away. Fig. 12 is a rear view of the gun with the cap removed. Figs. 13, 14, 15, 16, and 17 are cross-sectional views on lines *a—a*, *b—b*, *c—c*, *d—d*, and *e—e* of Fig. 1ª respectively. Figs. 18 and 19 are elevations respectively of the bell crank lever and the stopping pawl lever. Figs. 20 and 21 are respectively side and top views of the detent pawl. Fig. 22 is a perspective view of the cocking slide. Figs. 23 and 24 are detail views respectively of the catch which holds the cartridge magazine in position, and the safety lever. Figs. 25, 26 and 27 are detail views respectively of the trigger for automatic firing, the trigger for single firing and the sear. Fig. 28 is a bottom view of the breech bolt. Figs. 29, 30 and 31 are detail views showing the bell crank lever and the means for holding it in position. Fig. 32 is a bottom view of the cartridge magazine. Fig. 33 is a detail view of the end of the bar of the shoulder rest. Fig. 34 is a detail sectional view showing the connection of the piston and piston rod. Fig. 35 is a bottom view of a part of the flat portion of the gun frame in which the magazine is supported, showing the safety lever and abutment. Figs. 36 and 37 are detail views of the yielding abutment and its housing. Fig. 38 is a detail longitudinal section of the forward end of the breech bolt.

In the drawings 1 is the gun barrel screw-threaded at its rear end into the receiver 2 which is exteriorly screw-threaded at 3 to engage the gun frame 4, which is preferably a casting carrying the trunnions 5 and suitably formed to carry and support the operating parts of the gun. The receiver 2 is in a cylindrical tube extending to the rear end of the gun frame, provided on its interior with interrupted screw-threads for engaging companion interrupted screw-threads on the breech bolt, and provided also with a slot 6 in its upper forward portion to receive the cartridge and has retaining wings 7 at the rear portion of the slot 6 extending slightly into the interior of the receiver, adapted to engage the shell of the cartridge as it is fed from the magazine and hold it with its forward end in position to enter the breech of the gun barrel and its rear end in position to be engaged by the breech bolt as it moves forward. The receiver also has formed on its interior longitudinal grooves or guideways 8, between longitudinal ribs 9, for controlling and timing the reciprocating and locking movements of the breech bolt and has also in its upper portion a cam 10 in position to be struck by the ejector. The receiver has a longitudinal slot 11 in its under side to receive and guide the arm of the operating slide.

The gun frame 4 has in its upper portion a longitudinal cylindrical opening 12 in which the receiver 2 is supported and in its lower portion a longitudinal cylindrical opening 13 in which reciprocates the operating slide by which the breech mechanism and cartridge feeding mechanisms are actuated. Above the breech of the gun barrel 1 the gun frame has a flat portion 14 provided with an opening 15 in line with the slot 6 of the receiver and has at its center a spindle 16, preferably hollow, on which the rotary part of the cartridge magazine rotates. Concentric with the spindle 16 the flat portion 14 is preferably provided with an inclosing cylinder 17 to protect the drum of the cartridge magazine.

Forward of the cylinder 17 the gun frame 4 has a hollow head 18 adapted to receive the rear end of a cylinder 19 which incloses the gun barrel 1 and with the head 20 near the muzzle of the gun barrel forms a water jacket for cooling the gun barrel. Beneath the hollow head 18 in line with the lower cylindrical opening 13 the gun frame is provided with a hollow head 21 adapted to receive the rear end of a gas cylinder 22 in which reciprocates the piston by which the operating slide is actuated. The forward end of the gas cylinder 22 is secured in a hollow head 23 beneath and preferably integral with the forward head 20 of the water jacket. Beneath the cylinder 13 the gun frame is provided with a pistol grip 24 and trigger guard 25 and is suitably apertured to receive the sear and triggers. At its rear end concentric with the cylinder 13 the gun frame is provided with screw-threads 26 preferably interrupted, to receive the screw-threads 27 of a cap 28 by which the rear ends of the cylinder 13 and receiver 2 are closed.

On one side the lower cylinder 13 is cut away preferably from a point slightly forward of the line of the spindle 16 to a point slightly in rear of the line of the rear side of the cylinder 17 to form an opening through which access may be had to the interior of the cylinder 13 (Figs. 1ª, 9 and 17.) The gun frame is provided with a hinged door 29 by which this opening is closed when the gun is to be used. The gun frame is provided on the side opposite to that on which the hinged door 29 is located, with a guide-way 30 parallel with the cylinder 13 and communicating therewith by a slot 31, in which a cocking slide 32 is adapted to be reciprocated. This slide 32 has secured to it a handle 33 extending outward through a slot 34 in the side of the guide-way 30 and also has a lug 35 extending inward into the cylinder 13 to engage the operating slide. Also on the opposite side to that on which the hinged door 29 is located and in its lower portion the gun frame is cut away to form an opening 36 into the cylinder 13 for the discharge of the shells.

The operating slide 37, with its piston 38, piston rod 39, and spring 40 constitutes a single operating part through the reciprocation of which the cartridge is fed into position, pushed into the breech of the gun barrel, the breech closed by the breech bolt, the cartridge fired and the shell withdrawn and ejected. The piston 38 is at the forward end of the piston rod 39 which extends forward from the slide 37. This piston fits and is adapted to reciprocate in the gas cylinder 22, and is reciprocated in one direction by the spring 40 and in the other direction by the gases of discharge. The spring 40 bears at its forward end against the rear face of the piston and at its rear end bears against an abutment 41 through which the piston rod slides freely, the abutment being held against movement when the gun is to be used, as hereinafter described.

The hollow head 23 in which the forward end of the gas cylinder 22 is secured is in communication with the bore of the gun barrel 1 through openings 42 through which a portion of the gases of discharge enters the hollow head and acts upon the piston 38 to drive it rearward against the force of the spring 40. The forward end of the hollow head 23 is closed in any convenient manner, preferably by a hollow screw plug 43 provided on its flange with openings 44 so arranged that by unscrewing the plug these openings will be more or less exposed to permit the escape through them of the excess of gas taken into the gas cylinder. It will be apparent that while the projectile is passing through the portion of the barrel between the openings 42 and the muzzle it will momentarily act as a valve to check the escape of the gases and divert a portion of them through the openings 42 into the gas cylinder 23 to drive the piston 38 rearward.

The operating slide 37 is provided on its lower edge with a guide rib 45 preferably of considerable relative width as shown which fits and reciprocates in a longitudinal guide groove 46 formed in the bottom of the cylinder 13. This guide rib is cut away on its under side near its rear end to form a vertical shoulder 47 and an incline 48 leading rearward to this shoulder, and is cut away near its forward end to form a vertical shoulder 49 having an incline 50 leading forward to the lower edge of this shoulder, both of these shoulders being adapted to be engaged by the sear as hereinafter described. On its upper side near its rear end the operating slide has an upwardly projecting arm 51 which extends through and is guided in a guide slot 52 connecting the upper cylinder 12 and lower cylinder 13, and also extends into the receiver 2 through the slot 11. This arm 51 carries at its upper end the firing pin 53 (Fig. 28). On its rear end the operating slide is provided with a circular plate or disk 54 adapted to fit the interior of the cap 28 to form with it a dash pot to absorb the shock of the rearward movement of the slide. On its face which is toward the door 29 the slide 37 has formed therein a cam groove 55 inclined upward toward the rear and terminating at its front end in a horizontal portion. This cam groove is adapted to receive a pin 59 on the rear end of the horizontal arm of a bell crank lever 60 which is pivotally mounted on the hinged door 29 and is adapted as hereinafter described to rotate the cartridge magazine. On its opposite side the slide 37 is provided at its forward end with a semicircular head 62 adapted to fit the interior of the cylinder 13 and near the arm 51 is provided with a rearwardly inclined semicircular head 63 also fitting the interior of the cylinder 13 (Figs. 9, 15 and 16.) The face of the slide between the heads 62 and 63 is inclined outward toward the lower edge forming a cam face 64 the lower edge of which is in line with the discharge opening 36.

The abutment 41 is preferably cup shaped as shown on its forward face and is circular in cross-section and adapted to fit the interior of the cylinder 13. On its lower portion it has a lug 64 adapted to fit the guide groove 46 in the bottom of the cylinder 13. On its rear face the abutment is provided with an extension 65 having at its rear end a cam shoulder 66 adapted to be engaged by an arm 67 carried by the door 29 when the door is in closed position. The lug 64 holds the abutment in such axial position in cylinder 13 that the extension 65 will properly present the shoulder 66 for engagement with said arm 67.

68 is the breech bolt (see Fig. 28) which is arranged to have both reciprocating and rotary movement. The forward end of the breech bolt is solid except for a central tapered opening to receive the firing pin 53. In rear of this solid end the breech bolt is bored out and this bored out portion is slotted in its lower side to form a cam slot 69. The forward portions 69′ and 70′ of the sides of the cam slot are parallel with each other and with the axis of the breech bolt. The side in rear of the portion 69′ is cut away to form a portion 69² parallel with the axis of the breech bolt but in a different plane, the portions 69′ and 69² being connected by a cam incline 69³. The straight portion 70′ extends farther to the rear than does the straight portion 69′, and terminates in a cam 70² inclined rearward and toward the side 69² terminating about in line with the straight portion 69′. The upper end of the arm 51 is reduced in thickness so as to enter the cam slot 69. The breech bolt is provided on its exterior with longitudinal ribs 71 provided with locking lugs forming interrupted screw-threads adapted to engage the interrupted screw-threads formed in the longitudinal ribs 9 of the receiver, the ribs 71 being adapted to slide freely in the longitudinal grooves 8 of the receiver when disengaged from the interrupted screw-threads. At its forward end the breech bolt is provided, on opposite sides, in line with two of the ribs 71, with pivoted extractors 72 having their forward ends provided with hooks adapted to engage the rim of the cartridge shell, and normally spring-pressed inward, and is also provided at its forward end on its upper side with a pivoted ejector 73 (see Fig. 38) normally spring-pressed outward away from engagement with the rim of the cartridge by a spring 74, and having a cam 75 on its upper edge adapted to be engaged by cam 10 in the receiver as the breech bolt moves rearward to effect the ejection of the cartridge. The upper groove 8 of the receiver (see Figs. 12 to 16) is preferably made wider than the side grooves to receive the ejector and the breech bolt is provided near its rear end with a guide lug 76 in line with the ejector. In order to permit the breech bolt to rotate the ribs 9 are cut away at their forward ends for a distance corresponding with the length of the extractor and ejector, and these ribs are also suitably cut away to allow the guide lug 76 to turn with the breech bolt. As the operating slide begins to move rearward from its forward position, the upper end of the arm 51 will travel rearward between the parallel sides 69′ and 70′ without moving the breech bolt but as the rear edge of the upper end of the arm comes in contact with the cam 70² it will cause the breech bolt to rotate to disengage the locking lug on its ribs 71 from the screw-threads of the ribs 9 of the receiver and as the upper end of the arm continues its rearward movement it comes against the rear end of the slot 69 and carries the breech block bodily to the rear. On the return movement the upper end of the arm 51 carries the breech bolt bodily forward; the breech bolt being prevented from rotating by the engagement of its ribs 71 with the grooves 8, until the forward end of the breech bolt is in position to be locked. The further forward movement of the slide brings the upper end of the arm 51 against the cam incline 69³ causing the breech bolt to rotate to bring its locking lugs into engagement with the interrupted screw-threads of the receiver. In this position the slide will be engaged by the sear, as hereinafter described, when the gun is to be used for firing single shots. On releasing the slide by pressing the single shot trigger to depress the sear, the slide will complete its forward movement to drive the firing pin against the cartridge, the upper end of the arm 51 moving in a straight line between the parallel portions 69' and 70' of the sides of the cam slot.

The bell crank lever 60 (see Figs. 9, 10, 16, 17, and 18) is pivoted on a short shaft 77 carried by the door 29 and extending inward in a horizontal plane when the door is in closed position. Its horizontal arm 78 carries a pin 59 which, when the door is closed, engages the cam groove 55 of the operating slide 37. Its vertical arm 80 is provided with a yielding pawl 81 which extends upward through a slot 82 in the flat portion 14 of the gun frame into position to engage teeth 83 formed on the lower edge of the drum of the cartridge magazine. These teeth preferably have square faces on both sides. Pivoted to the upper part of the inwardly extending portion of the door 29 on a pivot 84 at right angles to the axis of the short shaft 77 is a lever 85 (see Figs. 9, 10, 16, and 19) having a pawl 86 at its upper end adapted, when in raised position, to extend through the slot 82 into engagement with the forward face of a tooth 83. This pawl is arranged to be upwardly spring-pressed by a spring 87 but is normally held in depressed position by the engagement with the tail piece 88 of the lever 85, of a cam 89 carried by the horizontal arm 78 of the bell crank lever 60. As the operating slide 37 moves rearward the cam groove 55 through its engagement with the pin 59 depresses the horizontal arm 78 of the bell crank lever and swings the vertical arm 80 forward causing the pawl 81 by its engagement with a tooth 83 to move the drum of the cartridge magazine forward. As the bell crank lever completes its movement the cam 89 permits the tail piece 88 of the lever 85 to be depressed and the other end of this lever to be raised by the spring 87 to swing its pawl 86 into the path of the tooth acted on by the pawl 81 to stop its further movement. The drum of the cartridge magazine is thus, through the action of the operating slide, fed forward positively at each forward movement of the slide a definite distance and any movement in excess of the desired movement is positively prevented. In order to lock the drum against backward movement the flat portion 14 of the gun frame is provided at a convenient point with a spring-pressed detent pawl 90 (see Figs. 8 and 20) adapted to yield to permit a tooth 83 to pass over it and to engage the rear face of the tooth to prevent any backward movement.

The cartridge magazine (see Figs. 3ª, 8 and 32) comprises essentially a rotary part provided with teeth 83 to be engaged by the pawls 81, 86 and 90 and adapted to carry the cartridges with it in its rotation, and a relatively fixed helical or auger guide by which as the cartridges are rotated, they are caused to be advanced toward the slot through which they are fed to the breech of the gun. In the present construction the rotary part consists of a drum 91 having the teeth 83 at its lower edge and having on its interior vertical inwardly extending radial wings 92 spaced apart a sufficient distance to receive between them the butt end of a cartridge. The helical or auger guide 93, in the present construction, is located within the drum 91 and is in the form of a flat strip or shelf 94 extending from end to end in the form of a helix about a central cylinder 95 which fits upon the spindle 16, the space between successive shelves or convolutions of the helix being adapted to receive the bullet end of a cartridge. The lowermost shelf or convolution or the helix is so formed as to present a horizontal face to the flat portion 14 of the gun frame on which it rests when in use and is provided with a radial slot 96 to afford free passage of the lowermost cartridge. In use this slot 96 is located in register with the opening 15 in the flat portion 14, the auger guide being locked in position by means of a pin 97 engaging a hole 98 in the lower face of the guide 93 (Figs. 17 and 23).

The helical or auger guide 93 and the drum 91 are secured together in any convenient manner which will permit of their relative rotation. In the construction shown the head 99 of the drum fits on a shoulder 100 on the outer end of the cylinder 95 on which it turns freely and is held there by an outer plate 101 secured to the cylinder. This outer plate is preferably provided with an indicator arm 102 which is so placed that when it is in line with the axis of the gun the slot 96 will be in register with the opening 15 through which the cartridges are fed to the breech of the gun.

The cartridge magazine is locked in position by any convenient means as by spring catches 103 (see Fig. 23) carried by the inclosing cylinder 17 engaging a peripheral shoulder 105 on the drum 91, the drum being guided in its rotation by the cylinder and by the shoulder 100 on the cylinder 95 which is carried on the spindle 16 when in position for use. The cartridge magazine may thus be readily placed in position or removed when empty and a fresh magazine substituted.

The cartridge magazine may readily be loaded by placing it in inverted position and inserting cartridges one by one with the bullet ends in the slot 96 and the butt ends in the space between two wings 92 rotating the helical guide or auger as the cartridges are placed in position, to carry them toward the head of the drum. The cartridge magazine being simple in construction and not easily gotten out of order may be made of inexpensive material and may be loaded at the place where the cartridges are made and will serve as a package for transporting the cartridges.

For the purpose of securing the proper feeding of the cartridges to the opening 15 a yielding abutment 104 (see Figs. 8, 35, 36 and 37) is provided mounted on the flat portion 14 having its end provided with a cam face 106 and extending over the opening 15 from the side opposite to that from which the cartridges are brought to the opening. This yielding abutment is formed on the arc of a circle concentric with the spindle 16 and its shank is carried in a housing 107 secured to the flat portion 14 of the gun frame. A spring 108 within the housing serves to yieldingly hold the head of the abutment over the opening 15. On its under side the abutment is provided with a lug 109 which extends through a slot 110 in the flat portion 14 in position to be engaged by a pivoted safety lever 111 (see Figs. 24 and 35) by which the abutment may be locked with its head over the opening 15 to prevent the feeding of cartridges. The safety lever 111 is pivoted on the under side of the flat portion 14 and is so arranged that when turned so as to be within the line of the cylinder 17 it will hold the abutment locked and when swung outward so as to be in plain sight it will be out of the way of the lug 109 and will permit the abutment to yield. The safety lever 111 will thus indicate whether the gun can be fired or is locked against firing. As the magazine is rotated it will bring a cartridge in line with the slot 96 and against the head of the abutment 104 pressing the abutment backward against the force of its spring 108, the resistance of the spring serving to check any momentum which the magazine may have and insuring its coming to rest without shock. As the magazine completes its movement it forces the cartridge against the cam face 106 which causes it to be positively fed through the opening 15 into the slot 6 of the receiver where it rests on the retaining wings 7 ready to be pushed forward by the breech bolt. The resistance of the yielding abutment will begin to act to check the movement of the magazine before the pawl 81 completes its feeding movement and before the stop pawl 86 is raised into position to positively stop further rotation.

The sear 112 (see Fig. 27) has at its forward end a journal 113 adapted to be received in and to swing in a bearing 114 formed in the portion of the gun frame directly below the cylinder 13 and its free end is upwardly spring-pressed by a spring 115 the tooth 116 extending upward through an aperture 117 in the bottom of the guide groove 46 into position to engage the shoulders 47 and 49 of the sear notches in the under side of the guide rib 45 of the operating slide. The rear end of the sear is formed on an arc of a circle the center of which is the axis on which it swings and is guided by suitable arc-shaped bearings in the gun frame. Between these bearings the sear is provided with a rearward extension 119 with which the forward ends of the triggers 120 and 121 engage.

The trigger 120 (see Fig. 25) controls the automatic action, being arranged to be capable of holding the free end of the sear depressed so that its tooth 116 will not engage either of the shoulders 47 or 49 and the trigger 121 (see Fig. 26) is arranged to be capable of only momentarily depressing the free end of the sear to free its tooth 116 from the shoulders 47 or 49 with which it may be engaged. The two triggers are arranged side by side and their forward ends normally rest upon the rearward extension 119 of the sear. The forward end of the trigger 120 rests on a flat shelf 122 (see Fig. 27) formed on one-half of the extension 119, and the trigger is pivoted on a pin 123. By pressing the finger piece of this trigger, the trigger acts as a lever to press the free end of the sear down and hold it down so long as the pressure on the trigger piece continues. The trigger 121 is formed with a hook 124 at its forward end to engage a hook 125 on the half of the extension 119 opposite that on which the shelf 122 is formed. This trigger 121 is pivoted on a pin 126 on which it is also permitted to have longitudinal movement. A spring 127 connected at one end to the trigger and at the other end to a pin 128 holds the trigger normally in its forward position with its hooked end engaging the hook 125 of the extension 119. On the under side of this trigger forward of its pivot is formed a cam 129 which, as the trigger is pressed, comes in contact with a pin 130 and as the pressure is continued the trigger is forced rearward against the force of the spring 127 causing its hooked end to slip rearward off the hook 125 on the extension 119. The sear being thus freed may be pressed upward by its spring 115 to bring its tooth 116 again into position to engage one of the shoulders 47 or 49.

The gun frame is preferably provided on the side on which the door 29 is located and preferably in rear of the door with a tubular sight support 131 in which is carried a rod 132 having at its upper end a cross rod 133 on which is mounted the rear sight 134. A hand wheel 135 is provided at the lower end of the sight support 131 for raising or lowering the rod 132 and a hand wheel 136 is provided on the cross rod 133 for shifting the rear sight 134 to the right or left as desired.

The pistol grip 24 is slotted to receive the upper end of an elevating screw 137 to which it is held by a pin 138.

The gun barrel 1 is preferably provided at the muzzle with an attachment for checking recoil (see Figs. 1ᵇ and 3ᵇ) consisting of a hollow extension 139 screw-threaded onto the muzzle having an opening 140 in line with the bore of the gun and a series of openings 141 in its periphery for the escape of the gases of discharge.

The cap 28 by which the rear end of the cylinder 13 is closed is provided with an extension 142 adapted to close the rear end of the receiver 2 and is preferably bored out at 143 in line with the bore of the receiver, to receive the rear end of the breech bolt. The extension 142 is provided with screw-threads 145 which engage screw-threads 146 on a lug 147 on the gun frame at the rear end of the receiver when the cap 28 is screwed into position to close the end of the cylinder 13. On one side of this extension 142 is formed a slot 148 which, when the cap is in position to close the end of the cylinder 13, is in line with a slot 149 formed in the side of the gun frame, the slots 148 and 149 being adapted to receive a bar 150 on the rear end of which is formed a shoulder rest 151 preferably padded as shown,—and on its rear face the cap is provided with lugs 152 forming between them a slot adapted to receive the bar 150 by which the cap may be screwed into closed position or unscrewed. When the bar 150 is inserted in the slots 148 and 149 the cap will be locked in position. For locking the bar 150 in position a removable pin 105 extending through lugs 118, and engaging a recess formed in the side of the bar, may be used. The forward end of the bar 150 is preferably formed as a screw driver (see Fig. 33) and this bar is thus adapted to serve as the only tool necessary to be used in assembling or disassembling the operating parts of the gun.

The hollow heads 18 and 20 of the water jacket are preferably each provided on their upper sides with an opening 153 controlled by a ball valve 154, the ball valves being so arranged that they will permit the entrance of water but will not let it escape at whatever angle the gun may be elevated or depressed. The head 20 preferably has in its under side an opening 155 closed by a screw plug 156 to permit the water to be let out from the water jacket.

The operating parts of the gun are so constructed as to be readily assembled and disassembled without the use of wrenches or other tools other than the bar 150 which is used in case of one or two parts only, and only for the purpose of exerting more force than can be readily exerted by the hands.

In order to disassemble the gun the bar 150 is first withdrawn from the slots 148 and 149 and inserted between the lugs 152 and used as a lever to unscrew the cap 28. On the removal of this cap and the opening of the door 29 the arm 67 being withdrawn by the door from engagement with the cam shoulder 66 carried by the abutment 41, the operating slide 37 with the abutment 41, the piston rod 39, piston 38 and spring 40 may be withdrawn through the rear end of the cylinder 13 bringing along the breech bolt 67 which may be lifted off the upper end of the arm 51.

The door 29 is hinged to the gun frame by means of a removable pintle 157 provided with a groove 158 which when the pintle is in position is in line with a hole adapted to receive a pin 160, the end of which enters the groove 158. When the door is closed this pin 160 is covered up by the shoulder 58 on the door and cannot fall out. When the door is opened the pin may be readily removed and the pintle 157 may then be withdrawn and the door removed.

The short shaft 77 on which the bell crank lever 60 is pivoted is preferably formed integral with the door 29 and projects inward therefrom. Near its inner end it is turned down to form a shoulder 161 (see Figs. 29, 30 and 31) on which is carried a torsion spring 162 one end of which engages a hole 163 in the shoulder and the other end engages a hole 164 in a locking disk 165 carried on a pin 166 which is preferably screw-threaded into the end of the short shaft 77. This disk 165 has on one side a lug 167. The bearing formed in the bell crank lever 60 to fit the short shaft 77 has a key-way 168 on one side adapted to receive the lug 167 and at the inner end of this key-way an offset 169 is formed adapted to receive the lug 167 into which it is turned by the spring 162, thus locking the bell crank lever against removal, the spring also acting through the locking disk 165 and its lug 167 to swing the vertical arm 80 toward the muzzle of the gun. The disk 165 is preferably provided in its face with a slot 170 to receive the screw driver end of the bar 150 by which it may be turned against the force of the spring 165 sufficiently to bring the lug 167 into line with the key-way 168 when the bell crank lever may be slipped off the shaft 77.

The yielding pawl 81 is mounted to slide vertically in the vertical arm 80 of the bell crank lever and is pressed upwardly by a spring 171 carried in a chamber 172 in the pawl, the lower end of the spring being supported on a pin 173 carried by the arm 80 and extending through a slot 174 in the pawl. By withdrawing the pin the pawl and its spring may be readily removed from the arm 80.

The pivot 84 (see Figs. 16 and 19) on which lever 85 swings is provided at its free end with radial lugs 175 and the bearing in the lever which fits over the pivot 84 is provided with key-ways 176 adapted to receive the lugs 175 but so located that they will not be in register with the lugs 175 when the lever is in operative position. After the bell crank lever 60 has been removed the lever 85 may be readily swung to bring the key-ways 176 into register with the lugs 175 when the lever may be slipped off its pivot. The spring 87 is preferably carried on a bent rod 177 secured at its lower end to the door 29. The upper end of this spring is bent to enter a hole 178 in the end of the lever 85 beneath the pawl 86. After the lever 85 has been detached from its pivot the spring 87 may be readily slipped off its rod 177.

When the parts are assembled a pin 179 carried by the door 29 prevents the horizontal arm 78 of the bell crank lever 60 from being swung too far by the torsion spring 162 so that the pin 59 is in proper position to enter the cam groove 55 when the door is closed.

In assembling the parts carried by the door the lever 85 and its spring 87 are first placed in position and the locking disk 165 is then turned by a screw driver against the force of the spring 162 to bring its lug 167 in line with the key-way 168 when the bell crank lever may be pushed onto the shaft. As it reaches its operative position the lug 167 passes into the offset 169 locking the bell crank lever against removal. In assembling these parts care should be taken to see that the tail piece 88 of the lever 85 is above the horizontal arm 78 of the bell crank lever and that the horizontal arm 78 is below the pin 179 before the bell crank lever is pushed fully back to operative position.

The door 29 is locked in closed position by a spring latch 180 of any convenient construction, engaging a notch 181 formed in the under side of the flat portion 14 of the gun frame.

The operating slide 37 and its connected parts, after being withdrawn through the open end of the cylinder 13, may be readily disassembled. For this purpose the piston 38 is constructed with a screw-threaded hub 182 (see Fig. 34) adapted to screw into the end of the piston rod 39 and the piston is provided on its inner face with a hole 182' adapted to register with a hole 183 in a lug 184 on the end of the piston rod. The spring 40 has its forward end 185 bent into line with the axis of the piston rod and this bent end 185 is adapted to extend through the hole 183 of the lug 184 into the hole 182' in the piston when the piston is screwed into position, thus locking the piston against unscrewing. In order to disassemble the parts the spring 40 is pressed back until its end 185 is withdrawn from the holes in the piston and in the lug 184 and the piston is then unscrewed and removed. The spring may then be slipped off the piston rod, and this being removed the abutment 41 may then be slipped off, the abutment being suitably notched to allow for the lug 184. These parts may be readily reassembled by first slipping the abutment into position, then slipping the spring onto the piston rod and finally screwing the piston into position and locking it by means of the bent end of the spring.

The cocking slide 32 (see Fig. 22) is for the purpose of drawing back the operating slide to open the breech to permit the first cartridge to be inserted and fired. After it has been drawn back to draw back the operating slide it should be returned to its forward position and the handle 33 turned down to bring its shank into engagement with a locking notch 187 (see Fig. 2) which extends downward from the slot 34 the cocking slide being held in engagement with the notch 187 by a coiled spring 188 in the forward end of the guide-way 30, which is of such tension as to serve as a buffer or cushion for the cocking slide as it reaches the limit of its forward movement and pushes it rearward after the handle is released sufficiently to cause the slide to engage the notch 187. In order to permit of the ready withdrawal of the cocking slide a cross slot 190 is formed at the rear end of the slot 31 in which the lug 35 reciprocates, this cross slot connecting the slot 31 with the outer slot 34. After the cap 28 has been removed and the operating slide drawn back by means of the cocking slide, the handle 33 being back of the end of the gun frame is swung upward to carry the lug 35 through the cross groove 190 into the slot 34, which is open at its rear end and permits the cocking slide to be bodily withdrawn.

The spring 115 which presses the free end of the sear upward is carried by a pin 191 preferably having a milled head 192 on its outer end, the upper end of the spring fitting into a recess 193 in the under side of the sear. The pin is provided with opposite laterally projecting lugs 194. The underside of the portion of the gun frame in which the bearing 114 for the journal 113 of the sear is formed is cut away to form an open slot 195 through which the sear may be inserted into operative position. In the walls of this slot 195 are formed opposite recesses 196 (Fig. 15) adapted to permit the lugs 194 to turn freely in them and having opposite locking notches 197 to receive the lugs 194 and in which they are held by the tension of the spring 115. In placing the sear in operative position its forward end is inserted through the slot 195 into its bearing 114 and the rear end of the sear pressed upward. The spring 115 and pin 191 is then inserted with its lugs 194 in line with the slot and pressed upward against the force of the spring until the lugs are opposite the recesses 196 when the pin is given a quarter turn which brings the lugs in line with the notches 197 into which they are forced by the spring, thus locking the pin and with it the sear against removal.

The triggers 120 and 121 are adapted to be readily inserted and removed without the use of tools. The lower portion of the gun frame below the cylinder 13 and in rear of the sear is suitably recessed to receive the triggers side by side and permit them to move freely on their pivots. The trigger 121, which, as above described, is adapted to momentarily depress the sear to fire a single shot, is first placed in position by inserting its finger end into the right-hand side of the trigger recess from the front, slipping the forward end of its spring 127 over the pin 128 and drawing the trigger rearward until the lug 198 on its upper side is in rear of the pivot pin 126 and pressing the trigger bodily over to the left until it is against the side of the trigger recess. The spring 127 will then draw the trigger forward to embrace the pivot pin 126 between the lugs 198 and the upper edge of the trigger. The trigger 120 may then be placed in position by inserting its finger end from the front into the trigger recess raising the trigger sufficiently to bring the lug 199 on its upper edge above the pivot pin 123. When the trigger 120 is in position the trigger 121 will be held against movement to the right to slip off its pivot 126. The triggers will, of course, be inserted in position before the sear is placed in position and the sear when in operating position locks the triggers against removal.

The detent pawl 90 (see Fig. 20) is preferably constructed to be capable of being readily detached without tools. It is carried by a hollow rod 200 in which is located a coiled spring 201 the rod 200 fitting in a socket 202 secured to the gun frame beneath the flat portion 14. The opening in the flat portion 14 through which the pawl 90 extends to engage the teeth 83 of the cartridge magazine is formed with a circular portion 204 adapted to receive the rod 200 and with slots extending in opposite directions from this circular portion. One of the slots is indicated by 206, the other is shorter and provided with a shoulder 207. The upper end of the rod 200 is provided with an outwardly extending lug 208 adapted to readily pass through the slot 206, and the middle portion of rod 200 is preferably roughened for convenience in handling. In order to place the pawl 90 in operating position one end of the spring 201 is inserted in the hollow rod 200 and the rod and spring is pushed through the circular portion 204 into the socket 202 and the lug 208 is brought in line with slot 206. The pawl and its rod 200 is then pressed down against the force of the spring until the head of the pawl is below the under surface of the flat portion 14 when the rod 200 is rotated to bring its lug 208 in line with the shorter slot into which it is forced by the spring until stopped by the shoulder 207 which is so located that when the lug 208 is against it, the pawl 90 will be at the right height to properly engage the teeth 83.

The spring catches 103 (see Fig. 23) for locking the cartridge magazine in position are each preferably carried in a socket 209 on the outside of the cylinder 17 with its hooked end normally projecting through an aperture in the side of the cylinder and with its upper end 210 projecting slightly above the top of the socket 209. The body portion of the catch is provided on opposite sides with pivots 211 adapted to fit grooves 212 formed in the side walls of the socket and in its rear below the pivots it is provided with a recess 213 to receive a spring 214 which when the catch is in position bears against the back of the socket. The grooves 212 are open downward so that by pressing the upper end 210 of the catch inward until the tooth of the catch is swung entirely out of the aperture in the cylinder 17 the catch may be pushed bodily downward out of the socket.

The safety lever 111 (see Figs. 24 and 35) is preferably so constructed as to be readily removed without the use of tools. It is pivoted beneath the flat portion 14 of the gun frame on a pin 215 which is provided with opposite lugs 216. The lever 111 is provided with a bearing fitting the shank of the pin 215 and having radial recesses 217 to receive the lugs 216 the recesses 217 being so located that they will be in line with the lugs 216 only when the lever is swung beyond the point to which it is intended to be swung when in use. The lever 111 is provided on one side with a flat spring 218 which normally presses against the under side of the flat portion 14 of the gun frame and normally limits the outward movement of the lever by contact with a stop formed by the side of a recess 219 formed in the under side of the flat portion 14.

In assembling the operating parts of the gun, the triggers and sear will be first placed in position, and the detent pawl 90, spring catches 103 and safety lever 111 may be then placed in position. The operating parts carried by the door 29 may then be conveniently assembled while the door is detached, and the door then placed in position and the pintle 157 inserted, the door being left open. The operating slide with the piston and piston rod, having been assembled, may then be placed in position by inserting the piston in the open end of the cylinder 13 and pushing it forward, the abutment 41 being so placed that its lug 64 will enter the guide groove 46 and the operating slide being so placed that its guide rib 45 will also enter this guide groove. As the operating slide with its connected parts is pushed forward it will be necessary to depress the sear to permit the lug of the abutment and the guide rib to pass freely forward. Before the breech bolt reaches the rear end of the receiver the cocking slide should be inserted in its guideway 30 with its handle swung upward. As the forward end of the breech bolt reaches the end of the receiver the handle of the cocking slide should be swung over to the left. As the operating slide is pushed farther forward the ribs 71 on the breech bolt enter the grooves or guideways 8 and as the operating slide is pushed farther forward it carries the breech bolt into the receiver and also carries forward with it the cocking slide. In order to push the operating slide to its forward position the cocking slide should be pushed forward against the force of its spring and its handle swung down into its locking notch. The cap 28 may then be screwed to closed position by the bar 150 and locked by inserting the bar in the slots 148, 149. A cartridge magazine previously loaded with cartridges may then be placed in position with the indicator arm 102 pointing forward in line with the axis of the gun, and the drum 91 should be rotated by hand until a cartridge is brought against the abutment 104 which is held in locked position by the safety lever 111. The door 29 may now be closed bringing the end of arm 67 into engagement with cam shoulder 66 on the rearward extension 65 of the abutment 41 putting the spring 40 slightly under tension and locking the abutment 41 against rearward movement. The closing of the door also brings the pawl 81 into position to engage the teeth 83 of the magazine. The gun is now ready for operation but is locked against operation by the safety lever 111. When it is desired to fire, the safety lever is swung out releasing the abutment 102 and the handle of the cocking slide 32 is released from its notch, and the slide drawn back drawing with it the operating slide and its connected parts, including the breech bolt, and causing, through the cam groove 55 and the bell crank lever 60, the magazine to be rotated to force a cartridge through the slot 96 against the cam face of the yielding abutment 104 and downward through the opening 15 into the slot 6 of the receiver where it is engaged by the retaining wings 7. As the cocking slide is returned to its initial position the operating slide will follow it under the action of the spring 40 until the shoulder 47 is engaged by the sear. In this forward movement of the operating slide the breech bolt is pushed against the butt of the cartridge carrying it forward into the breech of the gun and the breech bolt is rotated by the action of the upper end of the arm 51 on the cam incline 69³ of its slot 68 to lock it against rearward movement. On now pressing the trigger 121 the sear is withdrawn from engagement with the shoulder 47 and the slide permitted to be moved forward by the spring 40 causing the firing pin to strike the cartridge and fire it. On the firing taking place a portion of the gases of discharge passes into the forward end of the gas cylinder through the openings 42 and drives the piston forcibly to the rear and with it the operating slide, unlocking the breech bolt and withdrawing it, carrying with it the empty shell of the cartridge and bringing the ejector 73 against the cam 10 forcibly ejecting the empty shell which is guided to the discharge opening 36 by the cam face 64 and by the incline of the semicircular head 63. This rearward movement also causes the magazine to be rotated to feed another cartridge into position to be pushed into the breech. As the operating slide nears the end of its rearward movement its movement is checked and stopped by the resistance to the entrance of its disk 54 into the cap 28 and by the resistance of the spring 40, and it at once begins its forward movement, pushing the cartridge into the breech, locking the breech bolt and being stopped by the sear engaging shoulder 47 ready to be released by pressing trigger 121 to again fire a shot. If the trigger 120 is pressed and held when the gun is cocked the cartridge will be fired as before and the operating slide will be pushed rearward as before to unlock and open the breech, withdraw the empty shell and eject it and cause another cartridge to be fed into position, but as the operating slide moves forward, the sear being out of the way of the shoulder 47, the cartridge will be fired at once and these operations will be repeated as long as the trigger 120 is pressed and the supply of cartridges holds out. The cartridge magazine may be made to hold any desired number of cartridges, preferably 250, and the rapidity of fire when the trigger 120 is pressed and held will depend somewhat on the strength of the spring 40. A speed of fire of 240 rounds per minute may be readily secured.

In using the gun for automatic firing or semi-automatic firing the sear will not engage the shoulder 49. If it is desired to dispense with the magazine and feed cartridges one by one by hand to the breech, the tooth 116 of the sear may be made of a length sufficient to engage this shoulder. In such case on the rearward movement of the operating slide after firing it will be caught and held by the engagement of the sear with shoulder 49 in position to leave the breech open for the insertion of a cartridge and after a cartridge is inserted pressure on the trigger 121 will push the cartridge into the breech and, as the sear is only momentarily depressed by this trigger the sear will catch the shoulder 47 and hold the operating slide in position for firing on the trigger 121 being again pressed.

It will be noted that the feed of the cartridges to the receiver is positive and is not dependent on gravity and consequently the feed will take place with regularity and certainty whatever the elevation or depression of the gun.

The gun may be mounted on any convenient support. As shown in the drawing it is carried on a wheeled mount of which the axle is indicated at 56 and the wheel at 57.

It will of course be understood that the invention is not limited to the precise details of construction shown in the drawings as it is obvious that these may be varied considerably so long as the essential features of the gun are retained.

Having thus described my invention what I claim is:—

1. In a gun, the combination with breech mechanism, of a gun frame having a table formed thereon above the breech mechanism provided with an opening for the cartridges, a cartridge feed mechanism adapted to feed cartridges one by one to said opening, a yielding abutment mounted on the table and extending over the cartridge opening in the path of movement of the cartridges, and means for locking the abutment to prevent the feeding of the cartridges.

2. In a gun, the combination with breech mechanism, of a gun frame having a table formed thereon above the breech mechanism provided with an opening for the cartridges, a cartridge feed mechanism adapted to feed cartridges one by one to said opening, a yielding abutment mounted on the table and extending over the cartridge opening in the path of movement of the cartridges and having a cam face adapted to guide the cartridges to the cartridge opening, and means for locking the abutment to prevent the feeding of the cartridges.

3. In a gun, the combination with breech mechanism, of a gun frame having a table formed thereon above the breech mechanism provided with an opening for the cartridges, a cartridge feed mechanism adapted to feed cartridges one by one to said opening, a yielding abutment mounted on the table and extending over the cartridge opening in the path of movement of the cartridges and having a lug extending through the table and a safety lever adapted to engage the lug to lock the abutment to prevent the feeding of the cartridges.

4. In a gun, a cartridge feed mechanism comprising a relatively stationary member having a helical way adapted to guide the cartridges and a rotary member concentric with the stationary member provided with means for engaging the cartridges to move them in a helical path concentric with the stationary member, means for rotating the other member, a yielding abutment in the path of the cartridges and means for locking the abutment to prevent the movement of the cartridges.

5. In a gun, a cartridge feed mechanism comprising a relatively stationary member having a helical way adapted to guide the cartridges and a rotary member concentric with the stationary member provided with means for engaging the cartridges to move them in a helical path concentric with the stationary member, means for rotating the other member, a yielding abutment in the path of the cartridges and means for locking the abutment to prevent the movement of the cartridges and a detent pawl engaging the rotary member to prevent backward movement.

6. In a gun, a cartridge feed mechanism comprising a relatively stationary member having a helical way adapted to guide the cartridges and a rotary member concentric with the stationary member provided with means for engaging the cartridges to move them in a helical path concentric with the stationary member, a feed pawl for rotating the other member, a yielding abutment in the path of the cartridges and means for locking the abutment to prevent the movement of the cartridges and a stop pawl for stopping the movement of the rotary member.

7. In a gun, a cartridge feed mechanism comprising a relatively stationary member having a helical way adapted to guide the cartridges and a rotary member concentric with the stationary member provided with means for engaging the cartridges to move them in a helical path concentric with the stationary member, a feed pawl for rotating the other member, a yielding abutment in the path of the cartridges and means for locking the abutment to prevent the movement of the cartridges, a stopping pawl for stopping the movement of the rotary member and a detent pawl for preventing its backward movement.

8. In a gun, a cartridge feed mechanism comprising a relatively stationary inner member having a helical way adapted to engage the bullet ends of the cartridges to guide them and an outer rotary member concentric with the stationary member provided with means for engaging the shell ends of the cartridges to move them in a helical path concentric with the stationary member, means for rotating the other member, a yielding abutment in the path of the cartridges and means for locking the abutment to prevent the movement of the cartridges.

9. In a gun, a cartridge feed mechanism comprising a relatively stationary member having a helical way adapted to guide the cartridges and a rotary member concentric with the stationary member provided with means for engaging the cartridges to move them in a helical path concentric with the stationary member, means for rotating the other member, a yielding abutment independent of the rotating means arranged in the path of the cartridges and means for locking the abutment to prevent the movement of the cartridges.

10. In a gun, the combination with breech mechanism of a gun frame having a table formed thereon above the breech mechanism provided with an opening for the cartridges, a cartridge feed mechanism comprising concentric members secured together so as to be relatively rotatable, one of said members having a helical guide for the cartridges, and having its lower face adapted to engage the table and provided with a slot adapted to register with the cartridge opening therein, the other member being provided with means for engaging the cartridges to move them in a helical path concentric with the member having the helical guide, means for holding the member having the helical guide stationary with its slot in register with the cartridge opening in the table, means for rotating the other member, a yielding abutment normally extending over the cartridge opening in the table in the path of the cartridges, and means for locking the yielding abutment in normal position to prevent feeding the cartridges.

11. In a gun, the combination with breech mechanism of a gun frame having a table formed thereon above the breech mechanism provided with an opening for the cartridges, a cartridge feed mechanism comprising concentric members secured together so as to be relatively rotatable, one of said members having a helical guide for the cartridges, and having its lower face adapted to engage the table and provided with a slot adapted to register with the cartridge opening therein, the other member being provided with means for engaging the cartridges to move them in a helical path concentric with the member having the helical guide, means for holding the member having the helical guide stationary with its slot in register with the cartridge opening in the table, means for rotating the other member, a yielding abutment normally extending over the cartridge opening in the table in the path of the cartridges, and provided with a lug extending through the table and a safety lever adapted to engage the lug to lock the abutment to prevent feeding the cartridges.

12. In a gun, the combination with breech mechanism of a gun frame having a table formed thereon above the breech mechanism provided with an opening for the cartridges, a cartridge feed mechanism comprising concentric members secured together so as to be relatively rotatable, one of said members having a helical guide for the cartridges, and having its lower face adapted to engage the table and provided with a slot adapted to register with the cartridge opening therein, the other member being provided with means for engaging the cartridges to move them in a helical path concentric with the member having the helical guide, means for holding the member having the helical guide stationary with its slot in register with the cartridge opening in the table, means comprising a feed pawl mounted on a hinged door for rotating the other member, a yielding abutment normally extending over the cartridge opening in the table in the path of the cartridges, and means for locking the yielding abutment in normal position to prevent feeding the cartridges.

13. In a gun, the combination with breech mechanism of a gun frame having a table formed thereon above the breech mechanism provided with an opening for the cartridges, a cartridge feed mechanism comprising concentric members secured together so as to be relatively rotatable, the inner one of said members having a helical guide for the cartridges, and having its lower face adapted to engage the table and provided with a slot adapted to register with the cartridge opening therein, the outer member being provided with means for engaging the cartridges to move them in a helical path concentric with the inner member, means for holding the inner member stationary with its slot in register with the cartridge opening in the table, means for rotating the outer member, a yielding abutment mounted on the table normally extending over the cartridge opening in the table in the path of the cartridges, and means for locking the yielding abutment in normal position to prevent feeding the cartridges.

14. In a gun, the combination with breech mechanism of a gun frame having a table formed thereon above the breech mechanism provided with an opening for the cartridges, a cartridge feed mechanism comprising concentric members secured together so as to be relatively rotatable, the inner one of said members having a helical guide for the cartridges, and having its lower face adapted to engage the table and provided with a slot adapted to register with the cartridge opening therein, the outer member being provided with means for engaging the cartridges to move them in a helical path concentric with the inner member, means for holding the inner member stationary with its slot in register with the cartridge opening in the table, means for rotating the other member, a yielding abutment mounted on the table normally extending over the cartridge opening in the table in the path of the cartridges and provided with a lug extending through the table and a safety lever carried by the table adapted to engage the lug of the abutment to lock the abutment to prevent feeding the cartridges.

15. In a gun, the combination with breech mechanism and an operating slide adapted to operate the breech mechanism, a gun frame having a chamber for the operating slide open at its rear end, and provided with an exterior recess, a screw cap for closing the rear end of the chamber provided with a recess adapted to register with the recess on the gun frame when the cap is in closed position and a bar provided with a shoulder piece on its free end adapted to enter the recesses and lock the cap against removal.

16. In a gun, the combination with breech mechanism and an operating slide adapted to operate the breech mechanism, a gun frame having a chamber for the operating slide open at its rear end, and provided with an exterior recess, a screw cap for closing the rear end of the chamber provided with a recess adapted to register with the recess on the gun frame when the cap is in closed position and also provided with lugs on its outer end, and a bar adapted to enter the recesses to lock the cap against removal and to also enter between said lugs to serve as a wrench to rotate the cap.

17. In a gun, the combination with breech mechanism and an operating slide adapted to operate the breech mechanism, a gun frame having a chamber for the operating slide open at its rear end, and provided with an exterior recess, a screw cap for closing the rear end of the chamber provided with a recess adapted to register with the recess on the gun frame when the cap is in closed position, and also provided with lugs on its outer end, and a bar provided with a shoulder piece on its free end adapted to enter the recesses and lock the cap against removal and also adapted to enter between said lugs to serve as a wrench to rotate the cap.

18. In a gun, the combination with breech mechanism and an operating slide adapted to operate the breech mechanism, a gun frame having a chamber for the operating slide open at its rear end, and provided with an exterior recess, a screw cap for closing the rear end of the chamber provided with a recess adapted to register with the recess on the gun frame when the cap is in closed position and also provided with lugs on its outer end, and a bar having its end adapted to serve as a screw driver, adapted to enter the recesses and lock the cap against removal and also adapted to enter between said lugs to serve as a wrench to rotate the cap.

19. In a gun, the combination with breech mechanism and an operating slide adapted to operate the breech mechanism and arranged to be capable of automatic operation, of a gun frame provided with a chamber to receive and guide the operating slide, and with a guide-way parallel with the chamber open at its rear end having a longitudinal slot in its inner wall communicating with the chamber and a longitudinal slot in its outer wall, and a cocking slide adapted to be reciprocated in the guide-way having a lug adapted to extend through the slot in the inner wall into the chamber to engage the slide, and a handle adapted to extend outward through the slot in the outer wall of the guide-way, the wall of the guide-way being provided near its rear end with a cross slot connecting the two longitudinal slots adapted to receive the lug of the cocking slide, and a cap for closing the rear end of the guide-way.

20. In a gun, the combination of breech mechanism and an operating slide adapted to operate the breech mechanism and having a guide lug formed thereon, a piston rod extending forward from the operating slide, a piston on the piston rod, a spring on the piston rod, an abutment for the spring provided with a guide lug and with a lateral locking projection and mounted on the piston rod, and a gun frame having a chamber adapted to receive the slide, piston and abutment and provided with a guide groove adapted to receive the guide lugs of the slide and abutment and means adapted to engage said lateral locking projection for locking and releasing the abutment.

21. In a gun, the combination of breech mechanism and an operating slide adapted to operate the breech mechanism and having a guide lug formed thereon, a piston rod extending forward from the operating slide, a piston on the piston rod, a spring on the piston rod, an abutment for the spring provided with a guide lug and with a lateral locking projection and mounted on the piston rod, and a gun frame having a chamber adapted to receive the slide, piston and abutment, open at its rear end and provided with a guide groove adapted to receive the guide lugs of the slide and abutment, a removable cap for closing the rear end of the chamber, and means adapted to engage said lateral locking projection for locking and releasing the abutment.

22. In a gun, the combination of breech mechanism and an operating slide adapted to operate the breech mechanism, a piston rod extending forward from the operating slide, a piston on the piston rod, a spring on the piston rod, an abutment for the spring mounted on the piston rod and provided with a rearwardly extending arm, means for holding said abutment in a certain axial position and an arm adapted to engage the arm of the abutment mounted to swing into and out of engagement therewith to lock and release the abutment.

23. In a gun, the combination of breech mechanism and an operating slide adapted to operate the breech mechanism, a piston rod extending forward from the operating slide, a piston on the piston rod, a spring on the piston rod, an abutment for the spring mounted on the piston rod and provided with a rearwardly extending arm provided with a cam, means for holding said abutment in a certain axial position and an arm adapted to engage the cam of the arm of the abutment mounted to swing into and out of engagement therewith to lock and release the abutment.

24. In a gun, the combination of breech mechanism and an operating slide adapted to operate the breech mechanism, a piston rod extending forward from the operating slide, a piston on the piston rod, a spring on the piston rod, an abutment for the spring mounted on the piston rod and provided with a rearwardly extending arm arranged to one side of the path of movement of the operating slide, means for holding said abutment in a certain axial position and means for engaging the arm of the abutment to lock and release the abutment.

25. In a gun, the combination of breech mechanism and an operating slide adapted to operate the breech mechanism, a piston rod extending forward from the operating slide, a piston on the piston rod, a spring on the piston rod, an abutment for the spring mounted on the piston rod and provided with a rearwardly extending arm arranged to one side of the path of movement of the operating slide, means for holding said abutment in a certain axial position and an arm adapted to engage the arm of the abutment mounted to swing into and out of engagement therewith to lock and release the abutment.

26. In a gun, the combination of breech mechanism and an operating slide adapted to operate the breech mechanism having on one side a flat face provided with a cam groove and on the other side having at its ends substantially semicircular heads, the rear head having its forward face inclined rearward, and a gun frame having a chamber formed thereon adapted to receive the heads of the operating slide, and having a discharge opening in its lower portion.

27. In a gun, the combination of breech mechanism and an operating slide adapted to operate the breech mechanism having on one side a flat face provided with a cam groove and on the other side having at its ends substantially semicircular heads and having its body portion between the heads inclined outward, and a gun frame having a chamber formed therein adapted to receive the operating slide and having a discharge opening in its lower portion having its lower edge substantially in line with the lower edge of the incline of the slide.

28. In a gun, a cartridge feed device comprising concentric members one of which is relatively stationary, and the other of which is arranged to be capable of rotation, a gun frame having an open cylinder adapted to receive the feed device and spring latches carried by the cylinder engaging the rotary member to lock the cartridge feed device against removal.

29. In a gun, a cartridge feed device comprising concentric members one of which is relatively stationary, and the other of which is arranged to be capable of rotation, a gun frame having an open cylinder adapted to receive the feed device and provided with sockets and spring latches carried in said sockets and adapted to engage the rotary member to lock the cartridge feed device against removal.

30. In a gun, a cartridge feed device comprising concentric members one of which is relatively stationary, and the other of which is arranged to be capable of rotation, a gun frame having an open cylinder adapted to receive the feed device and provided with sockets open at their ends and each having an open bearing formed therein, and latches each having a pivot pin adapted to engage the bearing and a tooth adapted to extend through an opening in the cylinder to engage the rotary member, and springs bearing at one end against a latch and at the other end against the inner wall of a socket.

31. In a gun, a cartridge feed device comprising concentric members one of which is relatively stationary, and the other of which is arranged to be capable of rotation, a gun frame having an open cylinder adapted to receive the feed device and provided with sockets open at their ends and each having an open bearing formed therein and latches each having a pivot pin adapted to engage the open bearing and a tooth adapted to extend through an opening in the cylinder to engage the rotary member and springs bearing at one end against a latch and at the other end against the inner wall of a socket, the latches and sockets being of such relative size that when the tooth of the latch is withdrawn from the opening in the cylinder the latch may be removed from the socket.

This specification signed and witnessed this first day of June A. D. 1908.

SAMUEL N. McCLEAN.

In the presence of—
V. O. COCHRAN,
R. M. CALFEE.